United States Patent
Li et al.

(10) Patent No.: US 12,517,718 B2
(45) Date of Patent: Jan. 6, 2026

(54) UPGRADE PROMPT METHOD, TERMINAL DEVICE, AND COMPUTER-READABLE STORAGE MEDIUM

(71) Applicant: Huawei Technologies Co., Ltd., Shenzhen (CN)

(72) Inventors: Shubin Li, Shenzhen (CN); Lei Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 172 days.

(21) Appl. No.: 18/274,552

(22) PCT Filed: Dec. 20, 2021

(86) PCT No.: PCT/CN2021/139681
§ 371 (c)(1),
(2) Date: Jul. 27, 2023

(87) PCT Pub. No.: WO2022/161024
PCT Pub. Date: Aug. 4, 2022

(65) Prior Publication Data
US 2024/0095015 A1    Mar. 21, 2024

(30) Foreign Application Priority Data
Jan. 28, 2021 (CN) .......................... 202110121980.0

(51) Int. Cl.
*G06F 8/65* (2018.01)
*H04M 1/72406* (2021.01)

(52) U.S. Cl.
CPC .......... *G06F 8/65* (2013.01); *H04M 1/72406* (2021.01)

(58) Field of Classification Search
None
See application file for complete search history.

(56) References Cited

U.S. PATENT DOCUMENTS

| 9,983,866 B1 * | 5/2018 | Panchanathan | G06F 8/61 |
| 2004/0103412 A1 * | 5/2004 | Rao | G06F 8/65 |
| | | | 717/176 |

(Continued)

FOREIGN PATENT DOCUMENTS

| CN | 106250175 A | * 12/2016 |
| CN | 110413312 A | 11/2019 |
| CN | 110764808 A | 2/2020 |

*Primary Examiner* — Marina Lee
(74) *Attorney, Agent, or Firm* — Slater Matsil, LLP

(57) ABSTRACT

Embodiments relate to an upgrade prompt method, a terminal device, and a computer-readable storage medium. In the method, in response to the first terminal device having an upgrade version, a second terminal device and a target version corresponding to the second terminal device may be determined based on attribute information of the upgrade version, and a current version corresponding to the second terminal device may be obtained. Remark information of the second terminal device may be generated based on the target version and the current version that correspond to the second terminal device, and upgrade prompt information of the first terminal device may be generated based on the attribute information of the upgrade version and the remark information of the second terminal device, to perform an upgrade prompt operation on the first terminal device.

20 Claims, 16 Drawing Sheets

(56) References Cited

U.S. PATENT DOCUMENTS

| | | | |
|---|---|---|---|
| 2005/0149921 A1* | 7/2005 | Rollins | G06F 8/65 719/327 |
| 2015/0020058 A1* | 1/2015 | Cao | G06F 8/65 717/170 |
| 2019/0268243 A1* | 8/2019 | Blakeman | H04L 41/0895 |

* cited by examiner

UPGRADE PROMPT METHOD, TERMINAL DEVICE, AND COMPUTER-READABLE STORAGE MEDIUM

CROSS-REFERENCE TO RELATED APPLICATIONS

This application is a National Stage of International Application No. PCT/CN2021/139681 filed on Dec. 20, 2021, which claims priority to Chinese Patent Application No. 202110121980.0 filed on Jan. 28, 2021. Both of the aforementioned applications are hereby incorporated by reference in their entireties.

TECHNICAL FIELD

This application pertains to the field of terminal technologies, and in particular, relates to an upgrade prompt method, a terminal device, and a computer-readable storage medium.

BACKGROUND

When a terminal device or an application installed on the terminal device has a new version, the terminal device may display upgrade prompt information to prompt a user to update the terminal device or update the application. However, currently, update of terminal devices is independent, to be specific, upgrade prompt information displayed by each terminal device records only updated content of the terminal device or the application. With development of terminal technologies, there are an increasing quantity of multi-device interaction scenarios. Multi-device interaction is a process in which two or more terminal devices jointly implement a function. In multi-device interaction, an existing upgrade prompt manner cannot be used to determine whether the terminal device can perform an interactive operation with another terminal device after the terminal device is updated. This affects an interactive operation between a plurality of devices for a function, and affects user experience.

SUMMARY

Embodiments of this application provide an upgrade prompt method, a terminal device, and a computer-readable storage medium, to resolve a problem that an interactive operation between a plurality of devices for a function is affected because an existing upgrade prompt manner cannot be used to determine whether a terminal device can perform an interactive operation with another terminal device after the terminal device is updated.

According to a first aspect, an embodiment of this application provides an upgrade prompt method, where the method may include:
when it is determined that a first terminal device has an upgrade version, obtaining attribute information of the upgrade version;
determining, based on the attribute information of the upgrade version, a second terminal device and a target version corresponding to the second terminal device, where the second terminal device is a terminal device that can perform an interactive operation with the first terminal device for a new function or an optimized function, and the new function or the optimized function is a function that is added or optimized in the upgrade version;
obtaining a current version corresponding to the second terminal device, and generating remark information of the second terminal device based on the current version and the target version that correspond to the second terminal device;
generating upgrade prompt information of the first terminal device based on the attribute information of the upgrade version and the remark information of the second terminal device; and
performing upgrade prompt on the first terminal device based on the upgrade prompt information.

Based on the foregoing upgrade prompt method, when the first terminal device has an upgrade version, the second terminal device and the target version corresponding to the second terminal device may be determined based on attribute information of the upgrade version, and the current version corresponding to the second terminal device may be obtained. Next, the remark information corresponding to the second terminal device may be generated based on the target version and the current version that correspond to the second terminal device. Then, the upgrade prompt information of the first terminal device may be generated based on the attribute information of the upgrade version and the remark information corresponding to the second terminal device, and upgrade prompt may be performed on the first terminal device based on the upgrade prompt information, to prompt a user to upgrade the first terminal device, and display whether the second terminal device that can perform an interactive operation with the first terminal device can currently perform an interactive operation with the upgraded first terminal device. Therefore, the user can upgrade the second terminal device in a timely manner, thereby facilitating the interactive operation between the first terminal device and the second terminal device, improving user experience, and having high usability and practicality.

For example, the attribute information of the upgrade version includes a device identifier and a target version that correspond to a target terminal device.

The determining, based on the attribute information of the upgrade version, a second terminal device and a target version corresponding to the second terminal device may include:
determining the second terminal device from an associated device of the first terminal device based on the device identifier corresponding to the target terminal device, and determining, based on the target version corresponding to the target terminal device, the target version corresponding to the second terminal device.

In the upgrade prompt method provided in this solution, the attribute information of the upgrade version may include: (1) description information of a new function or an optimized function in current upgrade; and (2) device information of a target terminal device that can perform an interactive operation with the terminal device for the new function or the optimized function. The device information of the target terminal device may include information such as a device identifier (for example, a device name or a device model) and a target version that correspond to the target terminal device. The target version is an earliest version required for supporting the new function or the optimized function. Therefore, the second terminal device and the target version corresponding to the second terminal device may be directly determined from the associated device of the first terminal device based on the device identifier corresponding to the target terminal device. The second terminal device is one or more associated devices of the first terminal device, and the second terminal device is a terminal device that can perform an interactive operation with the first terminal device for a function. The associated device of the first terminal device may be a terminal device that is managed by using a same account as the first terminal device, for example, may be a terminal device of a same user; or may be a terminal device in a same network as the first terminal device, for example, may be a terminal device in a same Internet of things.

In a possible implementation of the first aspect, the method is applied to the first terminal device, the upgrade prompt information includes first prompt information and second prompt information, the first prompt information includes attribute information of the upgrade version, and the second prompt information includes the remark information of the second terminal device.

The performing upgrade prompt on the first terminal device based on the upgrade prompt information may include:
  displaying, by the first terminal device, the first prompt information and the second prompt information, or sending the first prompt information and the second prompt information to the second terminal device, to indicate the second terminal device to display the first prompt information and the second prompt information.

For example, the displaying, by the first terminal device, the first prompt information and the second prompt information may include:
  displaying, by the first terminal device, the first prompt information and the second prompt information by using a window.

For example, the displaying, by the first terminal device, the first prompt information and the second prompt information may include:
  displaying, by the first terminal device, the first prompt information and the second prompt information in an update interface corresponding to the upgrade version.

The upgrade prompt method provided in this solution may be performed by the first terminal device, that is, the upgrade prompt information may be generated by the first terminal device, and the first terminal device may control display of the upgrade prompt information. For example, the first terminal device may control simultaneous display of the first prompt information and the second prompt information in the upgrade prompt information. In other words, the remark information of the second terminal device may be displayed while the attribute information of the upgrade version corresponding to the first terminal device is displayed, so that the user can simultaneously learn about the upgrade version and a situation of the second terminal device, thereby improving user experience.

The first terminal device may control the first terminal device to display the upgrade prompt information or the second terminal device to display the upgrade prompt information. Specifically, when the first terminal device is a terminal device with a display screen, for example, when the first terminal device is a terminal device with a display screen, such as a mobile phone, a tablet computer, or a notebook computer, the first terminal device may directly display the upgrade prompt information after generating the upgrade prompt information. For example, the upgrade prompt information is displayed by using a pop-up window, or the upgrade prompt information is displayed in a system update interface of the first terminal device or an application update interface of an application thereof. When the first terminal device is a terminal device without a display screen, for example, when the first terminal device is a smart home device without a display screen, such as a smart speaker or a smart bulb, the upgrade version corresponding to the first terminal device is generally an upgrade version of firmware on the smart speaker or the smart bulb. In this case, the first terminal device may send the upgrade prompt information to the second terminal device to display the upgrade prompt information of the first terminal device by using the second terminal device, so as to prompt the user to upgrade the first terminal device or prompt the user to upgrade the first terminal device and the second terminal device.

In another possible implementation of the first aspect, the method is applied to the first terminal device, the upgrade prompt information includes first prompt information and second prompt information, the first prompt information includes attribute information of the upgrade version, and the second prompt information includes the remark information of the second terminal device.

The performing upgrade prompt on the first terminal device based on the upgrade prompt information may include:
  displaying, by the first terminal device, the first prompt information, or sending the first prompt information to the second terminal device, to indicate the second terminal device to display the first prompt information; and
  when it is detected that the first terminal device is upgraded to the upgrade version, displaying, by the first terminal device, the second prompt information, or sending the second prompt information to the second terminal device, to indicate the second terminal device to display the second prompt information.

In the upgrade prompt method provided in this solution, the first terminal device may control separate display of the first prompt information and the second prompt information in the upgrade prompt information. In this way, the first prompt information is first displayed to prompt the user to upgrade the first terminal device, and after it is determined that the second terminal device is upgraded to the upgrade version, the second prompt information is displayed to prompt whether the second terminal device needs to be upgraded, so that the user can upgrade the second terminal device in a timely manner, thereby facilitating the interactive operation between the first terminal device and the second terminal device for a function.

In a possible implementation of the first aspect, the method is applied to a cloud server, the upgrade prompt information includes first prompt information and second prompt information, the first prompt information includes attribute information of the upgrade version, and the second prompt information includes the remark information of the second terminal device.

The performing upgrade prompt on the first terminal device based on the upgrade prompt information may include:
  sending, by the cloud server, the first prompt information and the second prompt information to the first terminal device, or sending the first prompt information and the second prompt information to the second terminal device, to indicate the first terminal device or the second terminal device to display the first prompt information and the second prompt information.

The upgrade prompt method provided in this solution may be performed by the cloud server, that is, the upgrade prompt information may be generated by the cloud server, and the cloud server may control display of the upgrade prompt information. For example, the cloud server may control simultaneous display of the first prompt information and the second prompt information in the upgrade prompt information. In other words, the remark information of the second terminal device may be displayed while the attribute information of the upgrade version corresponding to the first terminal device is displayed, so that the user can simultaneously learn about the upgrade version and a situation of the second terminal device, thereby improving user experience.

The cloud server may control the first terminal device to display the upgrade prompt information or the second terminal device to display the upgrade prompt information. Specifically, after generating the upgrade prompt information of the first terminal device, the cloud server may determine, based on a device type of the first terminal device, a terminal device that displays the upgrade prompt information, that is, may determine, based on the device type of the first terminal device, whether to send the upgrade prompt information to the first terminal device for display or send the upgrade prompt information to the second terminal device for display. For example, when the first terminal device is a terminal device with a display screen, for example, when the first terminal device is a terminal device with a display screen, such as a mobile phone, a tablet computer, or a notebook computer, that is, when the first terminal device may display information, the cloud server may send the upgrade prompt information to the first terminal device to display the upgrade prompt information by using the first terminal device, so as to prompt the user to upgrade the first terminal device or upgrade the first terminal device and the second terminal device. When the first terminal device is a terminal device without a display screen, for example, when the first terminal device is a smart home device without a display screen, such as a smart speaker or a smart bulb, that is, in a scenario in which the first terminal device cannot display information, and when firmware of the first terminal device has an upgrade version, the cloud server may send the upgrade prompt information of the first terminal device to the second terminal device to display the upgrade prompt information of the first terminal device by using the second terminal device, so as to prompt the user to upgrade the first terminal device or upgrade the first terminal device and the second terminal device.

In another possible implementation of the first aspect, the method is applied to a cloud server, the upgrade prompt information includes first prompt information and second prompt information, the first prompt information includes attribute information of the upgrade version, and the second prompt information includes the remark information of the second terminal device.

The performing upgrade prompt on the first terminal device based on the upgrade prompt information may include:
  sending, by the cloud server, the first prompt information to the first terminal device, or sending the first prompt information to the second terminal device, to indicate the first terminal device or the second terminal device to display the first prompt information; and
  when it is determined that the first terminal device is upgraded to the upgrade version, sending, by the cloud server, the second prompt information to the first terminal device, or sending the second prompt information to the second terminal device, to indicate the first terminal device or the second terminal device to display the second prompt information.

In the upgrade prompt method provided in this solution, the cloud server may separately display the first prompt information and the second prompt information in the upgrade prompt information. In this way, the first prompt information is first displayed to prompt the user to upgrade the first terminal device, and after it is determined that the second terminal device is upgraded to the upgrade version, the second prompt information is displayed to prompt whether the second terminal device needs to be upgraded, so that the user can upgrade the second terminal device in a timely manner, thereby facilitating the interactive operation between the first terminal device and the second terminal device for a function.

For example, when the remark information of the second terminal device is that the second terminal device needs to be upgraded, the second prompt information further includes an upgrade button corresponding to the second terminal device, and the upgrade button is used to upgrade the second terminal device.

In the upgrade prompt method provided in this solution, when a second terminal device needs to be upgraded, the upgrade prompt information further includes an upgrade button corresponding to the second terminal device. That is, when the upgrade prompt information is displayed, the upgrade button corresponding to the second terminal device may be further displayed, so that the user can directly and quickly upgrade a system or an application of the second terminal device by tapping or touching the upgrade button, thereby improving upgrade efficiency, and improving user experience.

In a possible implementation, the upgrade prompt method provided in this embodiment of this application may also be applied to a scenario in which an application is installed on the first terminal device for the first time. Specifically, when the user installs an application on the first terminal device, the first terminal device may send program information of the application to the cloud server. After obtaining the program information of the application, the cloud server may determine, based on the program information, whether the application supports an interactive operation between a plurality of terminal devices. When the application supports an interactive operation between a plurality of terminal devices, the cloud server may also generate the upgrade prompt information of the first terminal device, and send the upgrade prompt information to the first terminal device for display. In this case, the upgrade prompt information generated by the cloud server may include the remark information corresponding to the second terminal device. The second terminal device is a terminal device that can perform an interactive operation with the first terminal device for the application. That is, in a scenario of installing an application, the generated upgrade prompt information may include the following information: Among terminal devices of the user, which terminal device can directly perform an interactive operation, for the application, with the first terminal device on which the application is installed, and which terminal device needs to be upgraded to perform an interactive operation, for the application, with the first terminal device on which the application is installed.

In this embodiment, the program information may include a type of the application. A preset type of a preset application that supports an interactive operation between a plurality of terminal devices may be preset on the cloud server. Therefore, when the cloud server obtains the type of the application, the cloud server may determine, based on the type of the application and the preset preset type, whether the application supports an interactive operation between a plurality of terminal devices.

Alternatively, the program information may include attribute information of the application. When developing an application, a developer may configure attribute information indicating whether the application supports an interactive operation between a plurality of terminal devices. Therefore, when the cloud server obtains the attribute information of the application, the cloud server may also determine, based on the attribute information of the application, whether the application supports an interactive operation between a plurality of terminal devices.

Alternatively, the program information may include a name of the application. When developing an application, a developer can set an interface for externally reading code of the application. Therefore, after the cloud server obtains the name of the application, the cloud server may obtain an interface of the application by using the name of the application, to read code of the application by using the interface, and determine, by analyzing the code of the application, whether the application supports an interactive operation between a plurality of terminal devices.

For example, when the application is downloaded and installed from an application store corresponding to the first terminal device, the first terminal device may display the upgrade prompt information of the first terminal device in an application interface that corresponds to the application and that is in the application store of the first terminal device. When the application is not downloaded and installed from an application store corresponding to the first terminal device, the first terminal device may directly display the upgrade prompt information of the first terminal device by using a pop-up window. For example, after the first terminal device completes installation of the application, the first terminal device may display, by using a pop-up window, the remark information corresponding to the second terminal device, so that the user can upgrade the second terminal device in a timely manner, and the first terminal device on which the application is installed can perform an interactive operation with the second terminal device for the application.

The application store corresponding to the first terminal device is an application store that can be managed and controlled by the first terminal device. For example, when the first terminal device is a type-A mobile phone, the application store corresponding to the first terminal device may be an application store provided or specified by a developer of the type-A mobile phone.

It should be noted that, after the application is installed on the first terminal device, when the application subsequently has an upgrade version, the cloud server may generate the upgrade prompt information of the first terminal device. In this case, the upgrade prompt information may include description information of a new function or an optimized function of the application and the remark information of the second terminal device.

According to a second aspect, an embodiment of this application provides an upgrade prompt apparatus, where the apparatus may include:
  an attribute information obtaining module, configured to: when it is determined that a first terminal device has an upgrade version, obtain attribute information of the upgrade version;
  a target version determining module, configured to determine, based on the attribute information of the upgrade version, a second terminal device and a target version corresponding to the second terminal device, where the second terminal device is a terminal device that can perform an interactive operation with the first terminal device for a new function or an optimized function, and the new function or the optimized function is a function that is added or optimized in the upgrade version;
  a remark information generation module, configured to: obtain a current version corresponding to the second terminal device, and generate remark information of the second terminal device based on the current version and the target version that correspond to the second terminal device;
  a prompt information generation module, configured to generate upgrade prompt information of the first terminal device based on the attribute information of the upgrade version and the remark information of the second terminal device; and
  an upgrade prompt module, configured to perform upgrade prompt on the first terminal device based on the upgrade prompt information.

For example, the attribute information of the upgrade version includes a device identifier and a target version that correspond to a target terminal device; and
  the target version determining module is specifically configured to: determine the second terminal device from an associated device of the first terminal device based on the device identifier corresponding to the target terminal device, and determine, based on the target version corresponding to the target terminal device, the target version corresponding to the second terminal device.

In a possible implementation of the second aspect, the apparatus is applied to the first terminal device, the upgrade prompt information includes first prompt information and second prompt information, the first prompt information includes attribute information of the upgrade version, and the second prompt information includes the remark information of the second terminal device; and
  the upgrade prompt module may include:
    a first display unit, configured to: display the first prompt information and the second prompt information, or send the first prompt information and the second prompt information to the second terminal device, to indicate the second terminal device to display the first prompt information and the second prompt information.

For example, the first display unit is specifically configured to display the first prompt information and the second prompt information by using a window.

For example, the first display unit is specifically configured to display the first prompt information and the second prompt information in an update interface corresponding to the upgrade version.

In another possible implementation of the second aspect, the apparatus is applied to the first terminal device, the upgrade prompt information includes first prompt information and second prompt information, the first prompt information includes attribute information of the upgrade version, and the second prompt information includes the remark information of the second terminal device; and
  the upgrade prompt module may include:
    a second display unit, configured to: display the first prompt information, or send the first prompt information to the second terminal device, to indicate the second terminal device to display the first prompt information; and
    a third display unit, configured to: when it is detected that the first terminal device is upgraded to the upgrade version, display, by the first terminal device, the second prompt information, or send the second prompt information to the second terminal device, to indicate the second terminal device to display the second prompt information.

In a possible implementation of the second aspect, the apparatus is applied to a cloud server, the upgrade prompt information includes first prompt information and second prompt information, the first prompt information includes attribute information of the upgrade version, and the second prompt information includes the remark information of the second terminal device; and the upgrade prompt module may include:

an upgrade prompt information sending unit, configured to: send the first prompt information and the second prompt information to the first terminal device, or send the first prompt information and the second prompt information to the second terminal device, to indicate the first terminal device or the second terminal device to display the first prompt information and the second prompt information.

In another possible implementation of the second aspect, the apparatus is applied to a cloud server, the upgrade prompt information includes first prompt information and second prompt information, the first prompt information includes attribute information of the upgrade version, and the second prompt information includes the remark information of the second terminal device; and the upgrade prompt module may include:

a first information sending unit, configured to: send the first prompt information to the first terminal device, or send the first prompt information to the second terminal device, to indicate the first terminal device or the second terminal device to display the first prompt information; and a second information sending unit, configured to: when it is determined that the first terminal device is upgraded to the upgrade version, send the second prompt information to the first terminal device, or send the second prompt information to the second terminal device, to indicate the first terminal device or the second terminal device to display the second prompt information.

It may be understood that, when the remark information of the second terminal device is that the second terminal device needs to be upgraded, the second prompt information further includes an upgrade button corresponding to the second terminal device, and the upgrade button is used to upgrade the second terminal device.

According to a third aspect, an embodiment of this application provides a terminal device, including a memory, a processor, and a computer program that is stored in the memory and that can be run on the processor. When the processor executes the computer program, the terminal device is enabled to implement the method according to any one of the implementations of the first aspect.

According to a fourth aspect, an embodiment of this application provides a computer-readable storage medium, where the computer-readable storage medium stores a computer program, and when the computer program is executed by a computer, the computer is enabled to implement the method according to any one of the implementations of the first aspect.

According to a fifth aspect, an embodiment of this application provides a computer program product, where when the computer program product is run on a terminal device, the terminal device is enabled to perform the method according to any one of the implementations of the first aspect.

It may understood that, for beneficial effects of the second aspect to the fifth aspect, refer to related descriptions in the first aspect. Details are not described herein again.

DETAILED DESCRIPTION OF ILLUSTRATIVE EMBODIMENTS

Figure 1:
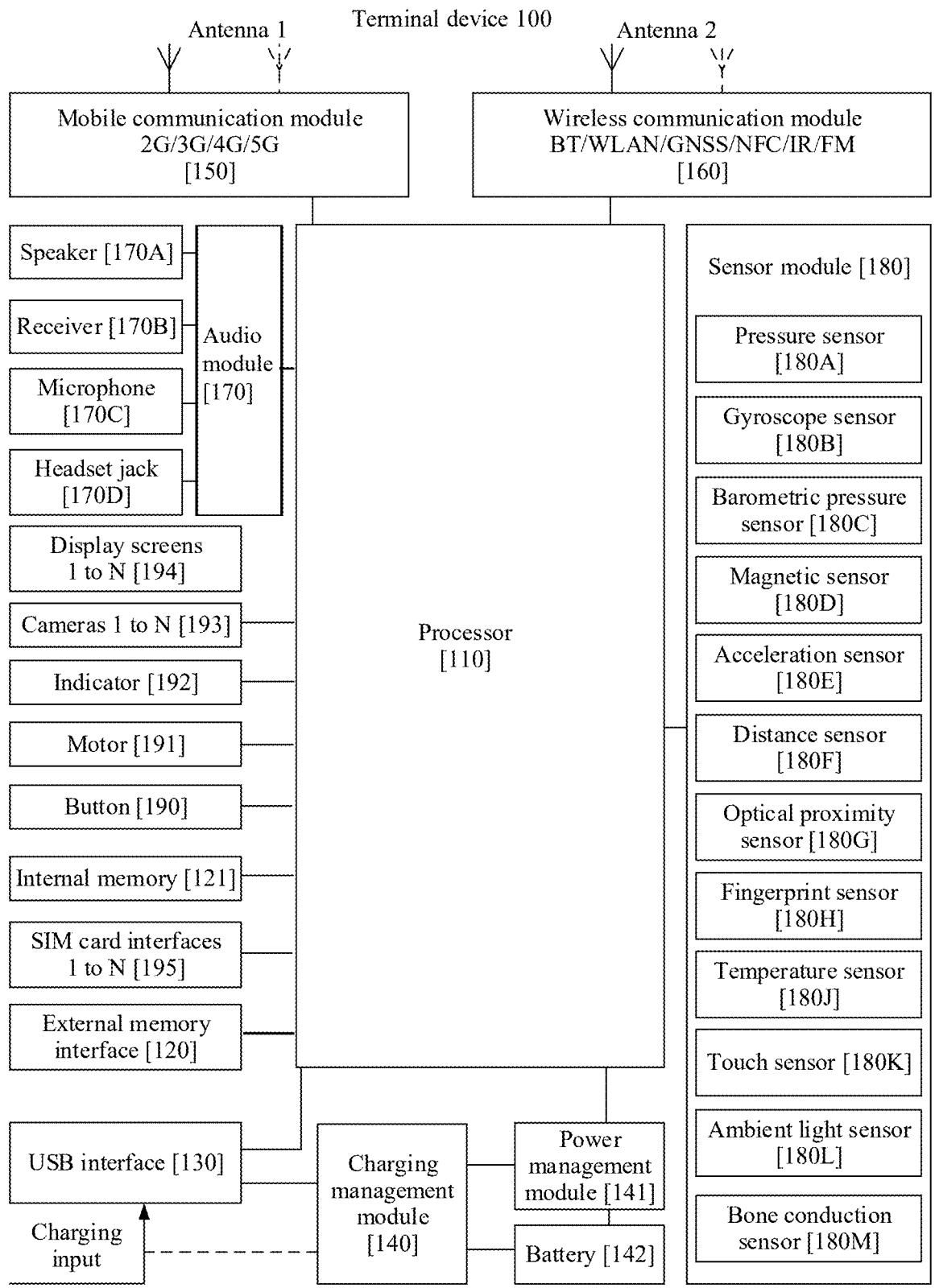
FIG. 1 is a schematic diagram of a structure of a terminal device according to an embodiment of this application.

It should be understood that, when used in the specification and the appended claims of this application, the term "include" indicates existence of a described feature, entirety, step, operation, element, and/or component, but does not exclude existence or addition of one or more other features, entireties, steps, operations, elements, components, and/or sets thereof.

It should also be understood that the term "and/or" used in the specification and the appended claims of this application indicates any combination and all possible combinations of one or more associated listed items, and includes these combinations.

As used in the specification and the appended claims of this application, the term "if" may be interpreted as "when", "once", "in response to determining", or "in response to detecting" based on the context. Similarly, based on the context, the phrase "if it is determined that" or "if (a described condition or event) is detected" may be interpreted as "once it is determined that", "in response to determining", "once (a described condition or event) is detected", or "in response to detecting (a described condition or event)".

In addition, in the descriptions of the specification and the appended claims of this application, the terms "first", "second", "third", and the like are merely used to distinguish between descriptions, but cannot be understood as an indication or an implication of relative importance.

Reference to "an embodiment", "some embodiments", or the like described in the specification of this application means that one or more embodiments of this application include a specific feature, structure, or characteristic described with reference to these embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

In addition, "a plurality of" mentioned in the embodiments of this application should be explained as two or more.

Steps in an upgrade prompt method provided in embodiments of this application are merely examples. Not all steps are mandatory, or not all content in each piece of information or each message is mandatory. The steps or the content may be added or reduced as required in a use process. A same step or steps or messages having a same function in the embodiments of this application may be mutually referenced in different embodiments.

The service scenario described in the embodiments of this application is intended to describe the technical solutions in the embodiments of this application more clearly, and does not constitute a limitation on the technical solutions provided in the embodiments of this application. A person of ordinary skill in the art may learn that, with evolution of network architectures and emergence of new service scenarios, the technical solutions provided in the embodiments of this application are also applicable to a similar technical problem.

When a terminal device or an application installed on the terminal device has a new version, the terminal device may display upgrade prompt information to prompt a user to update the terminal device or update the application. However, currently, upgrade prompt on terminal devices is independent, that is, upgrade prompt information displayed by each terminal device records only updated content of the terminal device or the application. With development of terminal technologies, there are an increasing quantity of multi-device interaction scenarios. Multi-device interaction is a process in which two or more terminal devices jointly implement a function. For example, a wireless screen projection function is implemented by using a mobile phone and a smart television, or a OneHop transmission function is implemented by using a mobile phone and a notebook computer, or a multi-screen collaboration function is implemented by using a mobile phone and a notebook computer. In multi-device interaction, an existing upgrade prompt manner cannot be used to determine whether a terminal device can perform an interactive operation with another terminal device after the terminal device is upgraded. This affects an interactive operation between a plurality of terminal devices for a function, and affects user experience.

To resolve the foregoing problem, the embodiments of this application provide an upgrade prompt method. In the method, when a first terminal device has an upgrade version, a second terminal device and a target version corresponding to the second terminal device may be determined based on attribute information of the upgrade version, and a current version corresponding to the second terminal device may be obtained. Next, remark information corresponding to the second terminal device may be generated based on the target version and the current version that correspond to the second terminal device. Then, upgrade prompt information of the first terminal device may be generated based on the attribute information of the upgrade version and the remark information corresponding to the second terminal device, and the upgrade prompt information may be displayed by using the first terminal device or the upgrade prompt information may be displayed by using the second terminal device, to prompt a user to upgrade the first terminal device, and display whether the second terminal device that can perform an interactive operation with the first terminal device can currently perform an interactive operation with the upgraded first terminal device. Therefore, the user can upgrade the second terminal device in a timely manner, thereby facilitating the interactive operation between the first terminal device and the second terminal device, improving user experience, and having high usability and practicality.

The upgrade prompt method provided in the embodiments of this application may be applied to a terminal device. The terminal device may be a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), a desktop computer, a cloud server, or the like. A specific type of the terminal device is not limited in the embodiments of this application.

The following first describes the terminal device in the embodiments of this application. FIG. 1 is a schematic diagram of a structure of a terminal device 100.

The terminal device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that, the structure illustrated in this embodiment of this application constitutes no specific limitation on the terminal device 100. In some other embodiments of this application, the terminal device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store an instruction or data that is just used or used cyclically by the processor 110. If the processor 110 needs to use the instruction or the data again, the instruction or the data may be directly invoked from the memory. This avoids repeated access, and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronous serial bus, and includes one serial data line (serial data line, SDA) and one serial clock line (serial clock line, SCL). In some embodiments, the processor 110 may include a plurality of groups of I2C buses. The processor no may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface to implement a touch function of the terminal device 100.

The I2S interface may be configured to perform audio communication. In some embodiments, the processor 110 may include a plurality of groups of I2S buses. The processor no may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth headset.

The PCM interface may be also configured to perform audio communication, to perform sampling, quantization, and encoding on an analog signal. In some embodiments, the audio module 170 may be coupled to the wireless communication module 160 through the PCM bus interface. In some embodiments, the audio module 170 may also transmit an audio signal to the wireless communication module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using a Bluetooth headset.

The MIPI interface may be configured to connect the processor 110 to a peripheral component such as the display screen 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the terminal device 100. The processor 110 communicates with the display screen 194 through the DSI interface, to implement a display function of the terminal device 100.

The GPIO interface may be configured by using software. The GPIO interface may be configured as a control signal, or may be configured as a data signal. In some embodiments, the GPIO interface may be configured to connect the processor 110 to the camera 193, the display screen 194, the wireless communication module 160, the audio module 170, the sensor module 180, or the like. The GPIO interface may be further configured as an I2C interface, an I2S interface, a UART interface, an MIPI interface, or the like.

The USB interface 130 is an interface that conforms to a USB standard specification, and may be specifically a mini USB interface, a micro USB interface, a USB Type C interface, or the like. The USB interface 130 may be configured to connect to the charger to charge the terminal device 100, or may be configured to transmit data between the terminal device 100 and a peripheral device, or may be configured to connect to a headset to play audio by using a headset. The interface may be further configured to connect to another terminal device, for example, an AR device.

It may be understood that, an interface connection relationship between the modules illustrated in this embodiment of this application is merely an example for description, and does not constitute a limitation on the structure of the terminal device 100. In some other embodiments of this application, the terminal device 100 may alternatively use an interface connection manner different from that in the foregoing embodiment, or a combination of a plurality of interface connection manners.

The charging management module 140 is configured to receive a charging input from a charger. The charger may be a wireless charger or a wired charger. In some embodiments of wired charging, the charging management module 140 may receive a charging input of the wired charger through the USB interface 130. In some embodiments of wireless charging, the charging management module 140 may receive a wireless charging input by using a wireless charging coil of the terminal device 100. When charging the battery 142, the charging management module 140 may further supply power to the terminal device by using the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, the display screen 194, the camera 193, the wireless communication module 160, and the like. The power management module 141 may be further configured to monitor parameters such as a battery capacity, a battery cycle count, and a battery state of health (current leakage or impedance). In some other embodiments, the power management module 141 may alternatively be disposed in the processor 110. In some other embodiments, the power management module 141 and the charging management module 140 may alternatively be disposed in a same component.

A wireless communication function of the terminal device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal device 100 may be configured to cover a single communication band or a plurality of communication bands. Different antennas may be further multiplexed to improve antenna utilization. For example, the antenna 1 may be multiplexed into a diversity antenna of a wireless local area network. In some other embodiments, the antenna may be used in combination with a tuning switch.

The mobile communication module 150 may provide a solution to wireless communication such as 2G, 3G, 4G, and 5G applied to the terminal device 100. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and send the electromagnetic wave to the modem processor for demodulation. The mobile communication module 150 may further amplify a signal modulated by the modem processor, and convert the signal into an electromagnetic wave by using the antenna 1 for radiation. In some embodiments, at least some functional modules of the mobile communication module 150 may be disposed in the processor no. In some embodiments, at least some functional modules of the mobile communication module 150 may be disposed in a same component as at least some modules of the processor no.

The modem processor may include a modulator and a demodulator. The modulator is configured to modulate a to-be-sent low-frequency baseband signal into an intermediate/high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal by using an audio device (which is not limited to the speaker 170A or the receiver 170B), or displays an image or a video by using the display screen 194. In some embodiments, the modem processor may be an independent component. In some other embodiments, the modem processor may be independent of the processor 110, and is disposed in a same component as the mobile communication module 150 or another functional module.

The wireless communication module 160 may provide a solution to wireless communication applied to the terminal device 100, for example, a wireless local area network (wireless local area networks, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, or an infrared (infrared, IR) technology. The wireless communication module 160 may be one or more components that integrate at least one communication processing module. The wireless communication module 160 receives an electromagnetic wave by using the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave by using the antenna 2 for radiation.

In some embodiments, the antenna 1 and the mobile communication module 150 of the terminal device 100 are coupled, and the antenna 2 and the wireless communication module 160 are coupled, so that the terminal device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The terminal device 100 implements a display function by using the GPU, the display screen 194, the application processor, and the like. The GPU is a microprocessor for image processing, and is connected to the display screen 194 and the application processor. The GPU is configured to perform mathematical and geometric calculation, and is configured to perform graphics rendering. The processor 110 may include one or more GPUs that execute program instructions to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini-LED, a microLED, a micro-OLED, a quantum dot light-emitting diode (quantum dot light-emitting diodes, QLED), or the like. In some embodiments, the terminal device 100 may include one or N display screens 194, where N is a positive integer greater than 1.

The terminal device 100 may implement a photographing function by using the ISP, the camera 193, the video codec, the GPU, the display screen 194, the application processor, and the like.

The external memory interface 120 may be configured to connect to an external memory card, for example, a micro SD card, to extend a storage capability of the terminal device 100. The external memory card communicates with the processor 110 through the external memory interface 120, to implement a data storage function, for example, to store a file such as music or a video into the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (for example, audio data or a phone book) and the like that are created in a process of using the terminal device 100. In addition, the internal memory 121 may include a high-speed random access memory, and may further include a non-volatile memory, such as at least one magnetic disk storage device, a flash memory device, or a universal flash storage (universal flash storage, UFS). The processor 110 runs the instructions stored in the internal memory 121 and/or the instructions stored in the memory disposed in the processor, to perform various function applications and data processing of the terminal device 100.

The terminal device 100 may implement an audio function by using the audio module 170, the speaker 170A, the receiver 170B, the microphone 170C, the headset jack 170D, the application processor, and the like, for example, music playing and sound recording.

The pressure sensor 180A is configured to sense a pressure signal, and may convert the pressure signal into an electrical signal. In some embodiments, the pressure sensor 180A may be disposed on the display screen 194. There are a plurality of types of pressure sensors 180A such as a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The terminal device 100 determines pressure strength based on a capacitance change. When a touch operation is performed on the display screen 194, the terminal device 100 detects strength of the touch operation based on the pressure sensor 180A. The terminal device 100 may further calculate a touch location based on a detection signal of the pressure sensor 180A. In some embodiments, touch operations that are performed at a same touch location but have different touch operation strength may correspond to different operation instructions. For example, when a touch operation whose touch operation strength is less than a first pressure threshold is performed on an SMS message application icon, an instruction for viewing an SMS message is executed. When a touch operation whose touch operation strength is greater than or equal to a first pressure threshold is performed on an SMS message application icon, an instruction for creating a new SMS message is executed.

The touch sensor 180K is also referred to as a "touch component". The touch sensor 180K may be disposed on the display screen 194, and the touch sensor 180K and the display screen 194 constitute a touchscreen that is also referred to as a "touchscreen". The touch sensor 180K is configured to detect a touch operation performed on or near the touch sensor 180K. The touch sensor may transfer the detected touch operation to the application processor to determine a type of a touch event, and may provide visual output related to the touch operation by using the display screen 194. In some other embodiments, the touch sensor 180K may be disposed on a surface of the terminal device 100, and is at a location different from a location of the display screen 194.

The button 190 includes a power button, a volume button, and the like. The button 190 may be a mechanical button, or may be a touch button. The terminal device 100 may receive a button input, and generate a button signal input related to a user setting and function control of the terminal device 100.

The motor 191 may generate a vibration prompt. The motor 191 may be configured to provide a vibration prompt for an incoming call, and may also be configured to provide a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display screen 194. Different application scenarios (for example, a time reminder, information receiving, an alarm clock, and a game) may also correspond to different vibration feedback effects. A touch vibration feedback effect may be further customized.

The indicator 192 may be an indicator light, may be configured to indicate a charging state and a battery power change, and may be further configured to indicate a message, a missed call, a notification, and the like.

The SIM card interface 195 is configured to connect to a SIM card. The SIM card may be inserted into the SIM card interface 195 or removed from the SIM card interface 195 to be in contact with or separated from the terminal device 100. The terminal device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195. Types of the plurality of cards may be the same or different. The SIM card interface 195 may also be compatible with different types of SIM cards. The SIM card interface 195 may also be compatible with an external storage card. The terminal device 100 interacts with a network by using the SIM card, to implement functions such as calling and data communication. In some embodiments, the terminal device 100 uses an eSIM, namely, an embedded SIM card. The eSIM card may be embedded into the terminal device 100, and cannot be separated from the terminal device 100.

A software system of the terminal device 100 may use a hierarchical architecture, an event-driven architecture, a microkernel architecture, a microservice architecture, or a cloud architecture. In this embodiment of this application, an Android system with a hierarchical architecture is used as an example to describe the software structure of the terminal device 100.

Figure 2:
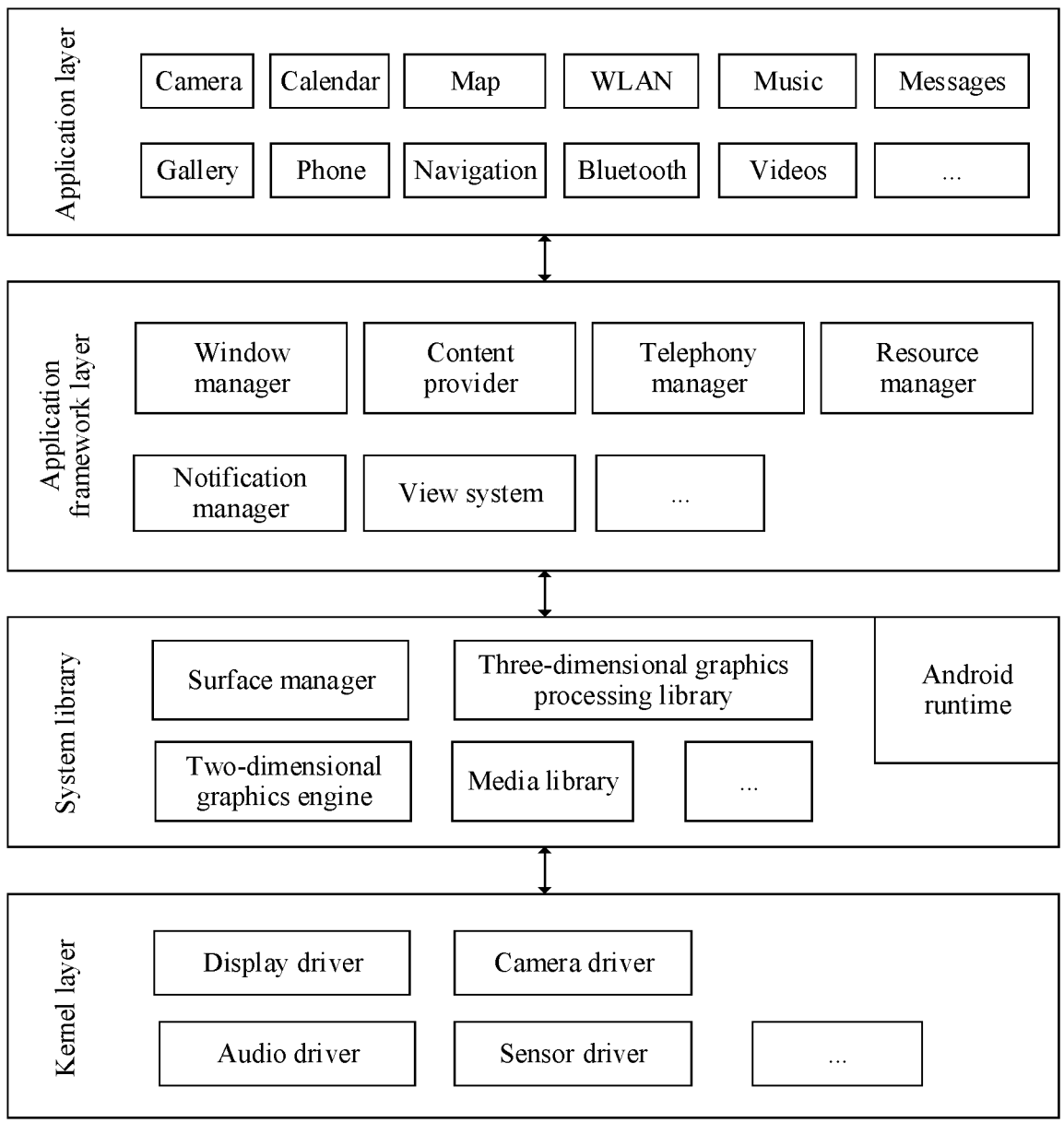
FIG. 2 is a schematic diagram of a software architecture of a terminal device according to an embodiment of this application.

FIG. 2 is a block diagram of a software structure of the terminal device 100 according to an embodiment of this application.

In the hierarchical architecture, software is divided into several layers, and each layer has a clear role and task. The layers communicate with each other through a software interface. In some embodiments, the Android system is divided into four layers that are respectively an application layer, an application framework layer, an Android runtime (Android runtime) and system library, and a kernel layer from top to bottom.

The application layer may include a series of application packages.

As shown in FIG. 2, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a telephony manager, a resource manager, a notification manager, and the like.

The window manager is used to manage a window program. The window manager may obtain a size of a display screen, determine whether there is a status bar, lock the screen, capture the screen, and the like.

The content provider is used to store and obtain data, so that the data can be accessed by an application. The data may include a video, an image, audio, calls that are made and answered, a browsing history and bookmarks, a phone book, and the like.

The view system includes visual controls such as a control for text display and a control for picture display. The view system may be used to construct an application. A display interface may include one or more views. For example, a display interface including an SMS message notification icon may include a view for text display and a view for picture display.

The view system may further draw a window based on upgrade prompt information, and display the drawn window in a display interface, to display, in the terminal device, the upgrade prompt information corresponding to an upgrade version.

The telephony manager is used to provide a communication function of the terminal device 100, for example, manage a call status (including answering, disconnecting, and the like).

The resource manager provides various resources such as a localized character string, an icon, a picture, a layout file, and a video file for an application.

The notification manager enables an application to display notification information in the status bar, and may be used to convey a message of a notification type. The message may automatically disappear after a short pause without interaction with the user. For example, the notification manager is used to notify download completion, provide a message prompt, and the like. The notification manager may further be a notification that appears in a top status bar of the system in a form of a graph or a scroll bar text, for example, a notification of an application running in background, or may further be a notification that appears on the screen in a form of a dialog window. For example, text information is prompted in the status bar, a prompt tone is made, the terminal device vibrates, or an indicator light flashes.

The Android runtime includes a core library and a virtual machine. The Android runtime is responsible for scheduling and managing the Android system.

The core library includes two parts: One part is a functional function that needs to be invoked in a Java language, and the other part is an Android core library.

The application layer and the application framework layer are run on the virtual machine. The virtual machine executes Java files of the application layer and the application framework layer as binary files. The virtual machine is used to perform functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is used to manage a display subsystem and provide fusion of 2D and 3D layers for a plurality of applications.

The media library supports playing and recording of a plurality of common audio and video formats, a still image file, and the like. The media library may support a plurality of audio and video coding formats, for example, MPEG4, H.264, MP3, AAC, AMR, JPG, and PNG.

The three-dimensional graphics processing library is used to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, a sensor driver, and the like.

The following describes working procedures of software and hardware of the terminal device 100 by using an example based on a capture/photographing scenario.

When the touch sensor 180K receives a touch operation, a corresponding hardware interrupt is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. An example in which the touch operation is a touch single-tap operation and a control corresponding to the single-tap operation is a control of a camera application icon is used. A camera application invokes an interface at the application framework layer, to start the camera application. Then, the camera driver is started by invoking the kernel layer, to capture a still image or a video by using the camera 193.

With reference to the accompanying drawings, the following describes in detail the upgrade prompt method provided in the embodiments of this application.

Embodiment 1

Figure 3:
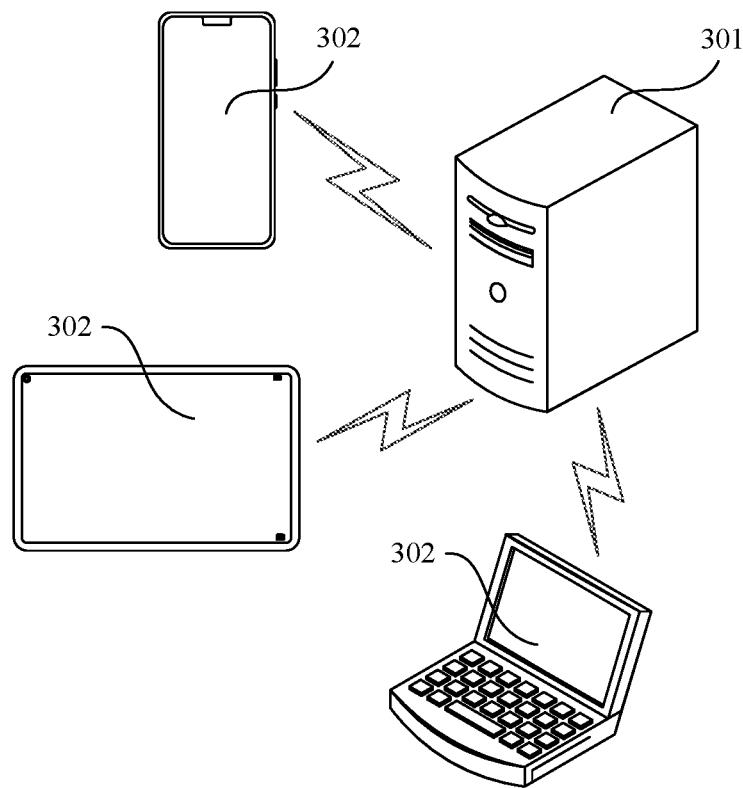
FIG. 3 is a schematic diagram of an application scenario of an upgrade prompt method according to an embodiment of this application.

FIG. 3 is a schematic diagram of an application scenario of an upgrade prompt method according to an embodiment of this application. As shown in FIG. 3, the application scenario may include a cloud server 301 and a plurality of terminal devices 302 (only three terminal devices are shown in FIG. 3). The cloud server 301 may be separately connected to each terminal device 302 by using a communication network. Each terminal device 302 may be a mobile phone, a tablet computer, a wearable device, a vehicle-mounted device, an AR/VR device, a notebook computer, a UMPC, a netbook, a PDA, a desktop computer, a smart speaker, a smart television, or the like.

When determining that a terminal device (referred to as a first terminal device below) in the plurality of terminal devices 302 has an upgrade version, the cloud server 301 may obtain attribute information of the upgrade version, and may determine, based on the attribute information of the upgrade version, a second terminal device and a target version corresponding to the second terminal device, and obtain a current version corresponding to the second terminal device. Next, the cloud server 301 may generate, based on the target version and the current version that correspond to the second terminal device, remark information corresponding to the second terminal device. Then, the cloud server 301 may generate upgrade prompt information of the first terminal device based on the attribute information of the upgrade version and the remark information corresponding to the second terminal device, and may send the upgrade prompt information to the first terminal device for display, or send the upgrade prompt information to the second terminal device for display, to prompt a user to upgrade the first terminal device, and display whether the second terminal device that can perform an interactive operation with the first terminal device can currently perform an interactive operation with the upgraded first terminal device. Therefore, the user can upgrade the second terminal device in a timely manner, thereby facilitating the interactive operation between the first terminal device and the second terminal device, that is, facilitating the interactive operation between the first terminal device and the second terminal device for a new function or an optimized function in the upgrade version, and improving user experience.

The upgrade prompt method provided in this embodiment is applied to a scenario in which an interactive operation can be performed between a plurality of terminal devices, that is, applied to a scenario in which an interactive operation can be performed between a plurality of terminal devices for a function. The interactive operation for a function means that the function needs to be implemented through interaction between two or more terminal devices. For example, the function may be a multi-screen collaboration function, a wireless screen projection function, a OneHop transmission function, or the like. For example, the function may alternatively be a management and control function for a smart home device such as a smart speaker, a smart television, or a smart bulb. It should be understood that the management and control function for the smart home device may be generally implemented by using an application corresponding to the smart home device.

Therefore, when the upgrade version is used to optimize only an existing function on the terminal device, but an optimized function obtained after optimization does not support an interactive operation between a plurality of terminal devices, or when a new function is added in the upgrade version, but the new function does not support an interactive operation between a plurality of terminal devices, the cloud server 301 may perform upgrade prompt on an existing upgrade prompt manner, that is, describe only the new function or the optimized function in the upgrade version. When the optimized function or the new function in the upgrade version supports an interactive operation between a plurality of terminal devices, the cloud server 301 may perform upgrade prompt based on the upgrade prompt method provided in this embodiment, that is, not only describe the new function or the optimized function in the upgrade version, but also display whether the second terminal device that can perform an interactive operation with the first terminal device for the new function or the optimized function can currently perform an interactive operation with the upgraded first terminal device for the new function or the optimized function. In this way, the user can clearly know which terminal device of the user can directly perform an interactive operation with the first terminal device after the first terminal device is upgraded, and which terminal device needs to be upgraded to perform an interactive operation with the first terminal device, so that the user can upgrade the second terminal device in a timely manner.

In this embodiment, the cloud server 301 may determine, based on the attribute information of the upgrade version, whether the new function or the optimized function in the upgrade version supports an interactive operation between a plurality of terminal devices. For example, when device information corresponding to a target terminal device is not configured in the attribute information of the upgrade version, the cloud server 301 may determine that the new function or the optimized function in the upgrade version does not support an interactive operation between a plurality of terminal devices. When device information corresponding to a target terminal device is configured in the attribute information of the upgrade version, the cloud server 301 may determine that the new function or the optimized function in the upgrade version can support an interactive operation between a plurality of terminal devices. Alternatively, the cloud server 301 may determine, based on a function type of the new function or the optimized function in the upgrade version, whether the new function or the optimized function in the upgrade version supports an interactive operation between a plurality of terminal devices. For example, a preset function type that supports an interactive operation between a plurality of terminal devices may be preset on the cloud server 301. When a function type of the new function or the optimized function in the upgrade version is the same as a preset function type, the cloud server 301 may determine that the new function or the optimized function in the upgrade version can support an interactive operation between a plurality of terminal devices.

Figure 4:
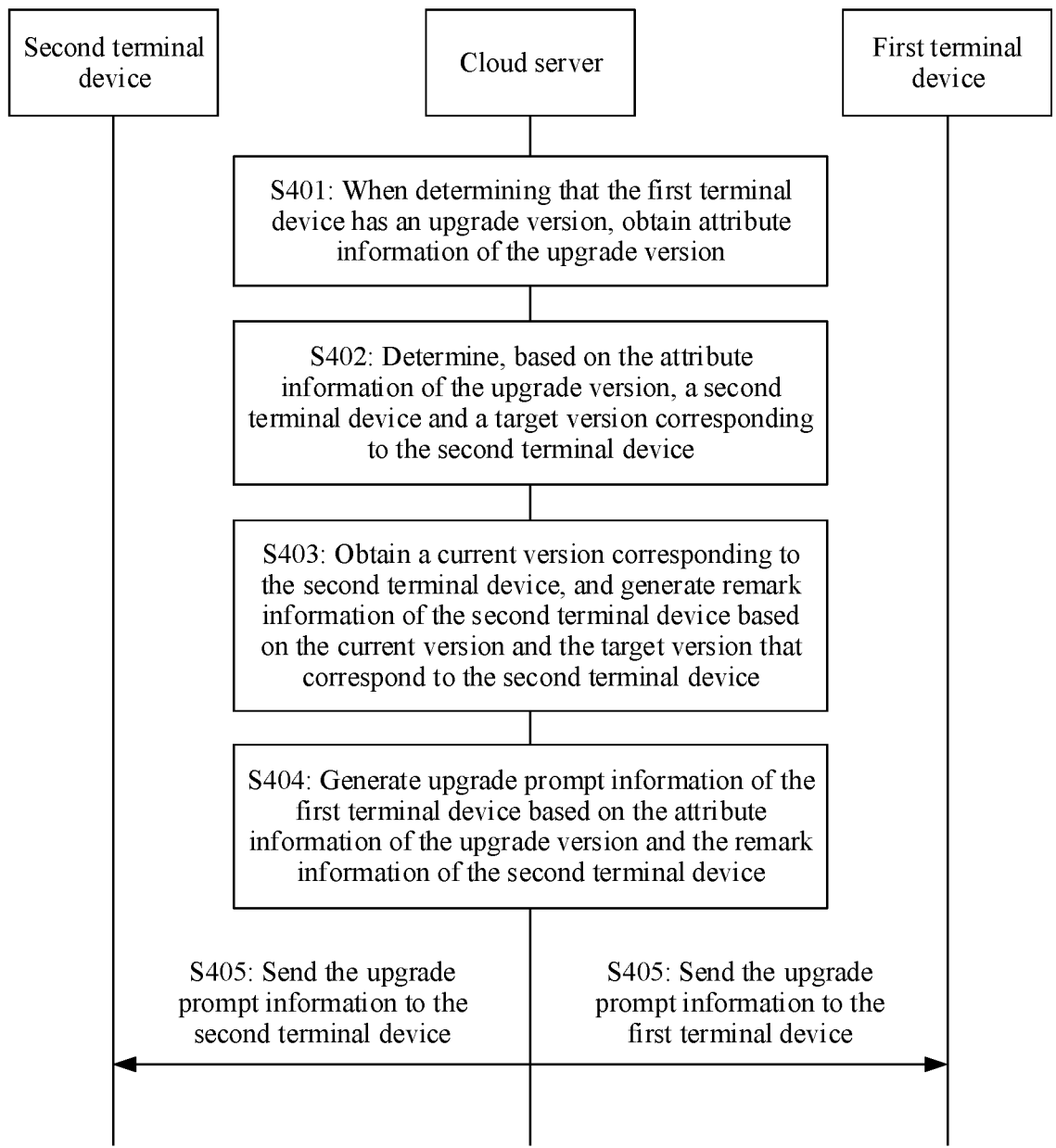
FIG. 4 is a schematic flowchart of an upgrade prompt method according to an embodiment of this application.

FIG. 4 is a schematic flowchart of an upgrade prompt method according to an embodiment. The method may be applied to the application scenario shown in FIG. 3, and the method is performed by the cloud server 301 in FIG. 3. As shown in FIG. 4, the method may include the following steps.

S401: When determining that the first terminal device has an upgrade version, the cloud server obtains attribute information of the upgrade version.

In this embodiment, after developing an upgrade version corresponding to any terminal device, a developer may configure attribute information corresponding to the upgrade version, and may send the upgrade version and the attribute information of the upgrade version to the cloud server 301. The attribute information of the upgrade version may include: (1) description information of a new function or an optimized function in current upgrade; and (2) device information of a target terminal device that can perform an interactive operation with the terminal device for the new function or the optimized function. The device information of the target terminal device may include information such as a device identifier (for example, a device name or a device model) and a target version that correspond to the target terminal device. The target version is an earliest version required for supporting the new function or the optimized function. The upgrade version corresponding to the terminal device may be an upgrade version of a system, for example, may be an upgrade version of an Android system, for example, may be Android 10.0.1 or Android 11.0.1; or may be an upgrade version of an Emotion UI (EMUI) system, for example, may be EMUI 11.0.0 or EMUI 11.1.0; or may be an upgrade version of a system (or firmware) of a Bluetooth headset or a smart speaker. The upgrade version corresponding to the terminal device may alternatively be an upgrade version of an application, for example, may be an upgrade version of AI Life, for example, may be AI Life Version 6.0.1 or Version 6.4.0. Herein, the developer may combine (1) and (2) in the attribute information into one file, and send the file to the cloud server 301, or may use (1) as a first file and use (2) as a second file, and separately send the first file and the second file to the cloud server 301.

It may be understood that, after establishing a communication connection to the first terminal device, the cloud server 301 may obtain device information such as a device identifier (for example, a device name or a device model) and a current version of the first terminal device in real time, and may determine, based on the obtained device identifier, a latest version that is on the cloud server 301 and that corresponds to the first terminal device. Then, the cloud server 301 may compare the current version corresponding to the first terminal device with the latest version. When the latest version is later than the current version corresponding to the first terminal device, the cloud server 301 may determine that the first terminal device has an upgrade version. In this case, the cloud server 301 may obtain the attribute information of the upgrade version, that is, obtain description information of a new function or an optimized function in the upgrade version and device information of a target terminal device that can perform an interactive operation with the first terminal device for the new function or the optimized function. The device information of the target terminal device may include a device identifier, a target version, and the like of the target terminal device. The target version corresponding to the target terminal device may be specifically configured by the developer based on an actual situation, for example, may be an earliest version of a system of the target terminal device, or may be an earliest version of an application on the target terminal device. The description information of the new function or the optimized function is used to briefly describe the new function or the optimized function.

For example, in a scenario in which the first terminal device is a mobile phone with an EMUI system, when the EMUI system has an upgrade version (for example, EMUI 11.1.0), and a OneHop transmission function is added in EMUI 11.1.0, the cloud server 301 may obtain attribute information of EMUI 11.1.0. The attribute information of EMUI 11.1.0 may include description information of the OneHop transmission function and device information such as a device identifier and a target version of a target terminal device that can perform OneHop transmission with the mobile phone. For example, the target terminal device may be a terminal device such as a type-A tablet computer or a type-B notebook computer. The target version corresponding to the target terminal device may be an earliest version of an application that manages the OneHop transmission function on the target terminal device, for example, may be an earliest version 10.1.0 of a computer manager on the type-A tablet computer, or may be an earliest version 11.0.1 of a computer manager on the type-B notebook computer.

For example, in a scenario in which the first terminal device is a mobile phone and an application (such as AI Life) that manages and controls a smart home device (such as a smart speaker or a smart television) is installed on the mobile phone, when the AI Life has an upgrade version (such as AI Life Version 5.0.0), and a management and control function for the smart home device is optimized in the AI Life Version 5.0.0, the cloud server 301 may obtain attribute information of the AI Life Version 5.0.0. The attribute information of the AI Life version 5.0.0 may include description information of an optimized function and device information such as a device identifier and a target version that correspond to a target terminal device. The target terminal device may be a smart home device corresponding to the optimized function. It is assumed that a management and control function for a smart speaker is optimized in the AI Life version 5.0.0. In this case, the target terminal device may be a smart speaker, and the target version corresponding to the target terminal device may be an earliest firmware version that is of the smart speaker and that supports the optimized function. It is assumed that a management and control function for a smart bulb is added in the AI Life version 5.0.0. In this case, the target terminal device may be a smart bulb, and the target version corresponding to the target terminal device may be an earliest firmware version that is of the smart bulb and that supports the management and control function in the AI Life 5.0.0.

S402: The cloud server determines, based on the attribute information of the upgrade version, a second terminal device and a target version corresponding to the second terminal device.

In this embodiment, the second terminal device is one or more associated devices of the first terminal device, and the second terminal device is a terminal device that can perform an interactive operation with the first terminal device for a function. The associated device of the first terminal device may be a terminal device that is managed by using a same account as the first terminal device, for example, may be a terminal device of a same user; or may be a terminal device in a same network as the first terminal device, for example, may be a terminal device in a same Internet of things. In addition, all associated devices of the first terminal device are communicatively connected to the cloud server 301, that is, the associated device of the first terminal device may be the terminal device in FIG. 3.

Specifically, when obtaining the attribute information of the upgrade version, the cloud server 301 may obtain the device information, included in the attribute information, such as the device identifier of the target terminal device. In this embodiment, all associated devices of the first terminal device are communicatively connected to the cloud server 301. Therefore, the cloud server 301 may further obtain device information such as a device identifier of the associated device. Then, the cloud server 301 may determine the second terminal device based on the device identifier of the target terminal device and the device identifier of the associated device, and may determine, based on the target version corresponding to the target terminal device, the target version corresponding to the second terminal device.

For example, in a scenario in which the first terminal device is a mobile phone with an EMUI system, when the EMUI system has an upgrade version EMUI 11.1.0 in which a multi-screen collaboration function is added, attribute information of EMUI 11.1.0 includes device information such as a device identifier and a target version that correspond to a target terminal device that can perform multi-screen collaboration with the mobile phone, and the target version may be an earliest version of a computer manager on the target terminal device. It is assumed that the target terminal device includes a type-A tablet computer and a type-B notebook computer, a target version of a computer manager on the type-A tablet computer is 10.1.0, and a target version of a computer manager on the type-B notebook computer is 11.0.1. When the associated device of the first terminal device includes a type-A tablet computer, a type-C tablet computer, and a type-D notebook computer, the cloud server 301 may determine that the second terminal device is the type-A tablet computer, and may determine that the target version of the type-A tablet computer is 10.1.0, that is, the computer manager on the type-A tablet computer needs to be of a version 10.1.0 or a later version to support multi-screen collaboration with the mobile phone.

For example, in a scenario in which the first terminal device is a tablet computer, when a computer manager on the tablet computer has an upgrade version 10.0.1 in which a OneHop transmission function is added, attribute information of the computer manager 10.0.1 includes device information such as a device identifier and a target version that correspond to a target terminal device that can perform OneHop transmission with the tablet computer. The target version may be an earliest version of a system of the target terminal device or an earliest version of an application on the target terminal device. It is assumed that the target terminal device includes a type-A mobile phone, a type-B mobile phone, and a type-C tablet computer, a target version of a system of the type-A mobile phone is EMUI 11.0.0, a target version of a system of the type-B mobile phone is EMUI 11.1.0, and a target version of a computer manager on the t e-C tablet computer is 10.1.0. When the associated device of the first terminal device includes a type-A mobile phone, a type-C tablet computer, and a type-D notebook computer, the cloud server 301 may determine that the second terminal device is the type-A mobile phone and the type-C tablet computer, and may determine that the target version of the type-A mobile phone is EMUI 11.0.0 and the target version of the t e-C tablet computer is 10.1.0, that is, a system version of the type-A mobile phone needs to be EMUI 11.0.0 or a later version to support OneHop transmission with the tablet computer, and that the computer manager on the type-C tablet computer needs to be of a version 10.1.0 or a later version to support OneHop transmission with the tablet computer.

For example, in a scenario in which the first terminal device is a mobile phone and an application (such as AI Life) that manages and controls a smart home device (such as a smart speaker or a smart television) is installed on the mobile phone, when the AI Life has an upgrade version Version 5.0.0, and a smart home device that can be managed and controlled is added in the AI Life Version 5.0.0, attribute information of the AI Life Version 5.0.0 may include device information such as a device identifier and a target version that correspond to the added smart home device (namely, the target terminal device). It is assumed that the added smart home device includes an S-type smart bulb and a T-type smart bulb, a target version of firmware of the S-type smart bulb is 3.7.0, and a target version of firmware of the T-type smart bulb is 2.5.2. When the associated device of the first terminal device includes a C-type tablet computer, a D-type notebook computer, and an S-type smart bulb, the cloud server 301 may determine that the second terminal device is the S-type smart bulb, and may determine that the target version of the S-type smart bulb is 3.7.0, that is, a firmware version of the S-type smart bulb needs to be 3.7.0 or a later version to support the management and control function in the AI Life version 5.0.0.

S403: The cloud server obtains a current version corresponding to the second terminal device, and generates remark information of the second terminal device based on the current version and the target version that correspond to the second terminal device.

In this embodiment, the cloud server 301 is communicatively connected to the second terminal device. Therefore, the cloud server 301 may further obtain device information such as the current version corresponding to the second terminal device. After obtaining the target version and the current version that correspond to the second terminal device, the cloud server 301 may compare the target version correspond to the second terminal device with the current version, to determine whether the second terminal device currently supports the new function or the optimized function in the upgrade version of the first terminal device, that is, determine whether the second terminal device supports an interactive operation with the first terminal device for the new function or the optimized function in the upgrade version after the first terminal device is upgraded to the upgrade version.

Herein, when the target version corresponding to the second terminal device is later than the current version corresponding to the second terminal device, the cloud server 301 may determine that the second terminal device currently does not support the new function or the optimized function in the upgrade version of the first terminal device, that is, the second terminal device of the current version cannot perform an interactive operation with the upgraded first terminal device for the new function or the optimized function. To enable the second terminal device to perform an interactive operation with the upgraded first terminal device for the new function or the optimized function, the second terminal device needs to be upgraded to at least the target version corresponding to the second terminal device. In this case, the cloud server 301 may generate the remark information that the second terminal device needs to be upgraded to the target version or a later version corresponding to the second terminal device to support the new function or the optimized function in the upgrade version of the first terminal device.

When the target version corresponding to the second terminal device is equal to the current version corresponding to the second terminal device, the cloud server 301 may determine that the second terminal device currently supports the new function or the optimized function in the upgrade version of the first terminal device, that is, the second terminal device may perform an interactive operation with the upgraded first terminal device for the new function or the optimized function in the upgrade version without being upgraded. In this case, the cloud server 301 may generate the remark information that the second terminal device currently supports the new function or the optimized function in the upgrade version of the first terminal device.

S404: The cloud server generates upgrade prompt information of the first terminal device based on the attribute information of the upgrade version and the remark information of the second terminal device.

S405: The cloud server sends the upgrade prompt information to the first terminal device for display, or sends the upgrade prompt information to the second terminal device for display.

In this embodiment, the upgrade prompt information may include: (1) a version number of the upgrade version and the description information of the new function or the optimized function in the upgrade version; and (2) the remark information of the second terminal device. The description information of the new function or the optimized function is used to briefly describe the new function or the optimized function. The remark information of the second terminal device is used to identify, among terminal devices of the user, which terminal device can directly perform an interactive operation with the upgraded first terminal device for the new function or the optimized function, and which terminal device needs to be upgraded to perform an interactive operation with the upgraded first terminal device for the new function or the optimized function. That is, the upgrade prompt information may be used to prompt the user to upgrade the first terminal device. In addition, the upgrade prompt information is used to notify the user of the following information: which terminal device of the user can directly perform an interactive operation with the first terminal device for the new function or the optimized function after the first terminal device is upgraded, and which terminal device needs to be upgraded to perform an interactive operation with the first terminal device for the new function or the optimized function. Therefore, the user can upgrade the second terminal device in a timely manner based on the upgrade prompt information, thereby facilitating the interactive operation between the upgraded first terminal device and the second terminal device for the new function or the optimized function, improving a use effect of the new function or the optimized function in the upgrade version, and improving user experience.

It should be noted that, after generating the upgrade prompt information of the first terminal device, the cloud server 301 may determine, based on a device type of the first terminal device, a terminal device that displays the upgrade prompt information, that is, may determine, based on the device type of the first terminal device, whether to send the upgrade prompt information to the first terminal device for display or send the upgrade prompt information to the second terminal device for display. For example, when the first terminal device is a terminal device with a display screen, for example, when the first terminal device is a terminal device with a display screen, such as a mobile phone, a tablet computer, or a notebook computer, that is, when the first terminal device may display information, the cloud server 301 may send the upgrade prompt information to the first terminal device to display the upgrade prompt information by using the first terminal device, so as to prompt the user to upgrade the first terminal device or upgrade the first terminal device and the second terminal device. When the first terminal device is a terminal device without a display screen, for example, when the first terminal device is a smart home device without a display screen, such as a smart speaker or a smart bulb, that is, in a scenario in which the first terminal device cannot display information, and when firmware of the first terminal device has an upgrade version, the cloud server 301 may send the upgrade prompt information of the first terminal device to the second terminal device to display the upgrade prompt information of the first terminal device by using the second terminal device, so as to prompt the user to upgrade the first terminal device or upgrade the first terminal device and the second terminal device. An application that manages and controls the first terminal device is installed on the second terminal device, and the second terminal device may perform firmware upgrade on the first terminal device by using the application. The following is described by using an example in which the cloud server 301 sends the upgrade prompt information to the first terminal device for display.

It may be understood that (1) and (2) in the upgrade prompt information may be displayed simultaneously or separately. Separate display means that the first terminal device may first display (1) in the upgrade prompt information, and then display (2) in the upgrade prompt information after determining that the first terminal device is upgraded to the upgrade version corresponding to the first terminal device.

Figure 5A:
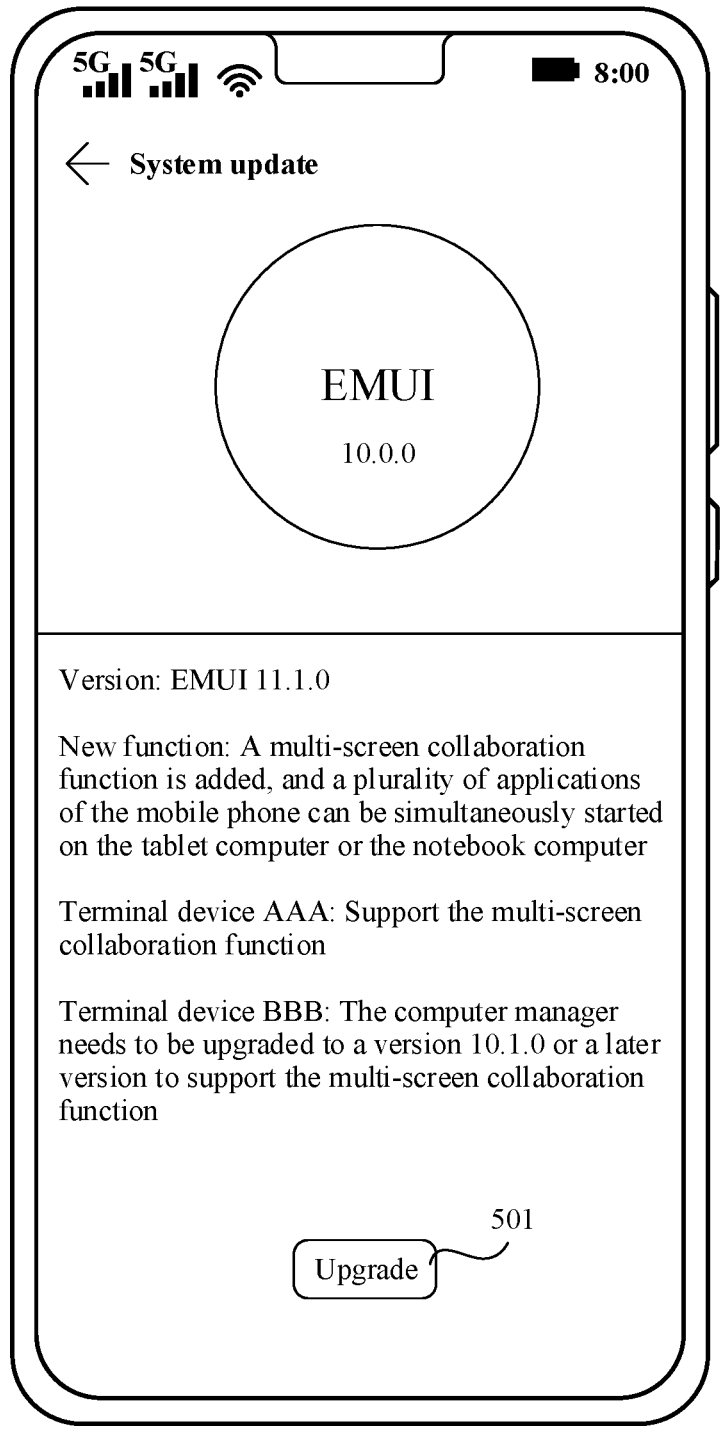
FIG. 5(a) to FIG. 5(c) are a schematic diagram of an application scenario of displaying upgrade prompt information according to an embodiment of this application.
Figure 5B:
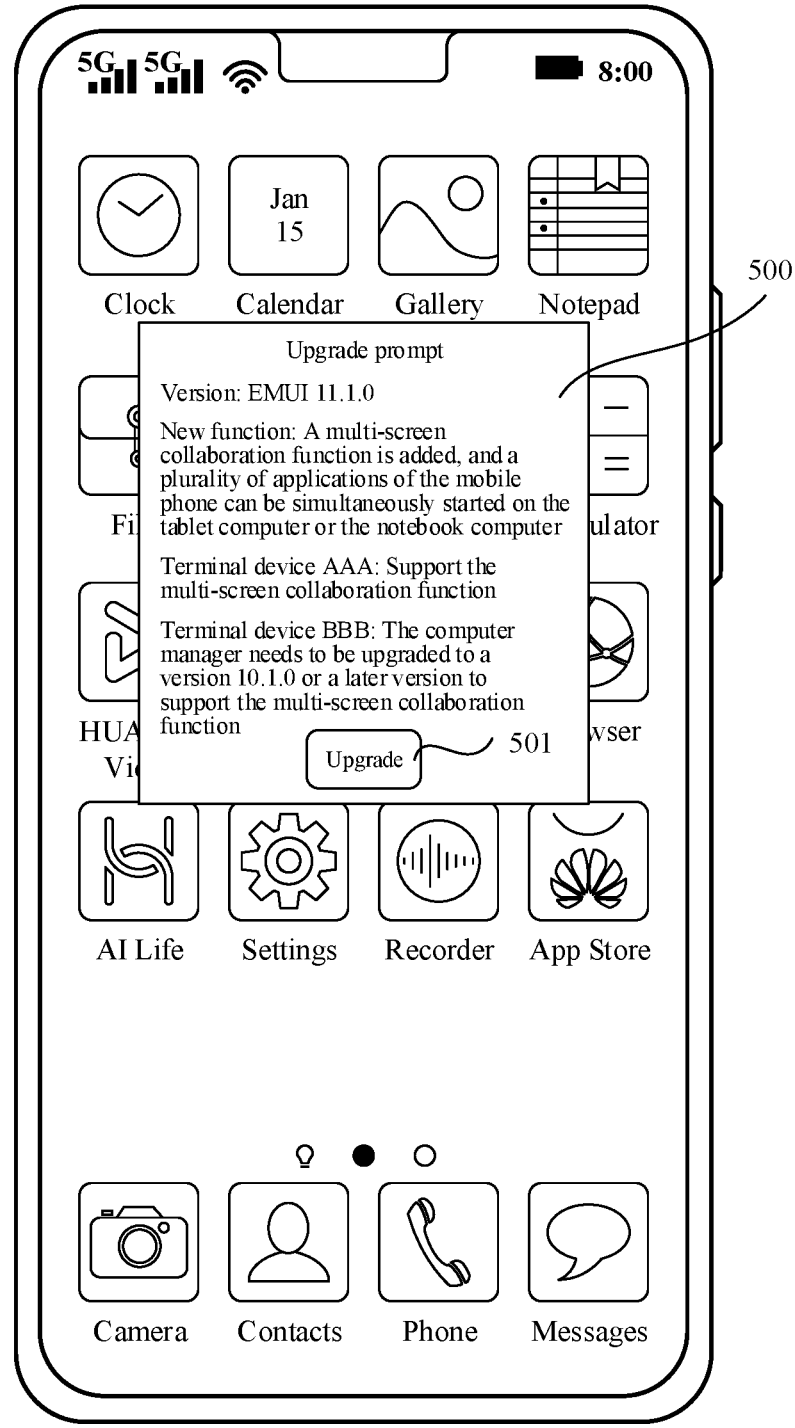
Figure 5C:
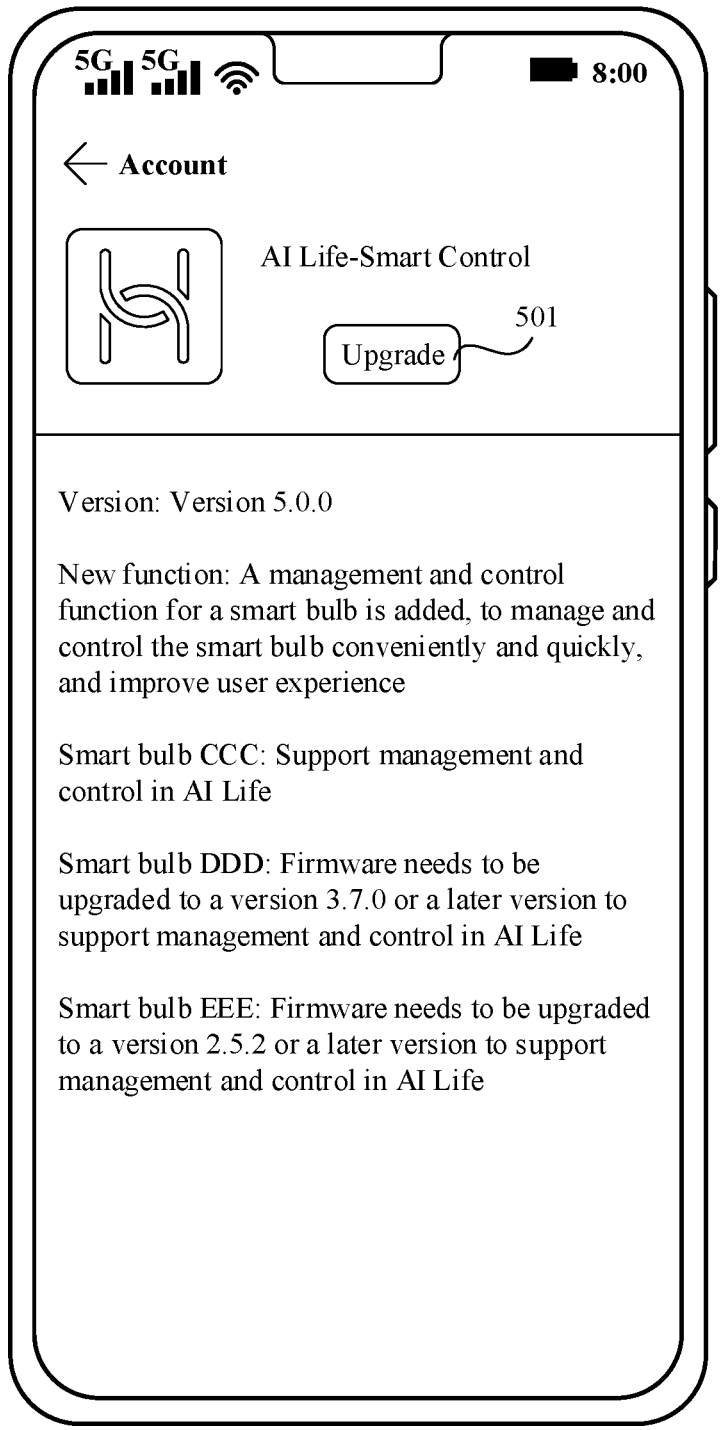

FIG. 5(a) to FIG. 5(c) are a schematic diagram of an application scenario in which a first terminal device displays upgrade prompt information. As shown in FIG. 5(a), when the upgrade version corresponding to the first terminal device (for example, a mobile phone) is an upgrade version (for example, EMUI 11.1.0) of a system, a multi-screen collaboration function is added in EMUI 11.1.0, and the multi-screen collaboration function may be used between the mobile phone and a tablet computer or a notebook computer whose computer manager is of a version 10.1.0 or a later version, the first terminal device may display (1) and (2) in the upgrade prompt information in a system update interface of the first terminal device. In the upgrade prompt information, (1) may be "Version: EMUI 11.1.0. New function: A multi-screen collaboration function is added, and a plurality of applications of the mobile phone can be simultaneously started on the tablet computer or the notebook computer". In the upgrade prompt information, (2) may be "Terminal device AAA: Support the multi-screen collaboration function. Terminal device BBB: The computer manager needs to be upgraded to a version 10.1.0 or a later version to support the multi-screen collaboration function". In addition, the system update interface may further display a first upgrade button 501, and the first upgrade button 501 is used to trigger the first terminal device to perform system upgrade. That is, when the user taps or touches the first upgrade button 501, the first terminal device may upgrade the system of the first terminal device to EMUI 11.1.0.

Alternatively, as shown in FIG. 5(b), the first terminal device may pop up an upgrade prompt window 500, and the upgrade prompt window 500 may display (1) and (2) in the upgrade prompt information and the first upgrade button 501. The first terminal device may pop up the upgrade prompt window 500 on a home screen of the first terminal device, or may pop up the upgrade prompt window 500 in any application interface of the first terminal device, or may pop up the upgrade prompt window 500 on a lock screen when the first terminal device is in a screen-locked state. This is not limited in this embodiment. In FIG. 5(b), an example in which the upgrade prompt window 500 pops up on the home screen of the first terminal device is used for description. Herein, the home screen of the first terminal device may display application icons such as Clock, Calendar, Gallery, Notepad, Browser, Contacts, Phone, Settings, Computer, and Messages.

As shown in FIG. 5(c), when the upgrade version corresponding to the first terminal device is an upgrade version (for example, AI Life Version 5.0.0) of an application, a management and control function for a smart bulb is added in the AI Life Version 5.0.0, and the application is downloaded and installed from an application store of the first terminal device, the first terminal device may display (1) and (2) in the upgrade prompt information in an application update interface that corresponds to the application and that is in the application store. In the upgrade prompt information, (1) may be "Version: Version 5.0.0. New function: A management and control function for a smart bulb is added, to manage and control the smart bulb conveniently and quickly, and improve user experience". In the upgrade prompt information, (2) may be "Smart bulb CCC: Support management and control in AI Life. Smart bulb DDD: Firmware needs to be upgraded to a version 3.7.0 or a later version to support management and control in AI Life. Smart bulb EEE: Firmware needs to be upgraded to a version 2.5.2 or a later version to support management and control in AI Life". In addition, the application update interface may further display a first upgrade button 501. In this case, the first upgrade button 501 is used to trigger the first terminal device to upgrade the application.

When the application is not downloaded and installed from the application store of the first terminal device, an upgrade prompt window may pop up in a display interface of the first terminal device, and the upgrade prompt window may display (1) and (2) in the upgrade prompt information and display a first upgrade button. It may be understood that, when the application is downloaded and installed from the application store of the first terminal device, the first terminal device may alternatively display (1) and (2) in the upgrade prompt information, a first upgrade button, and the like by popping up an upgrade prompt window.

Figure 6A:
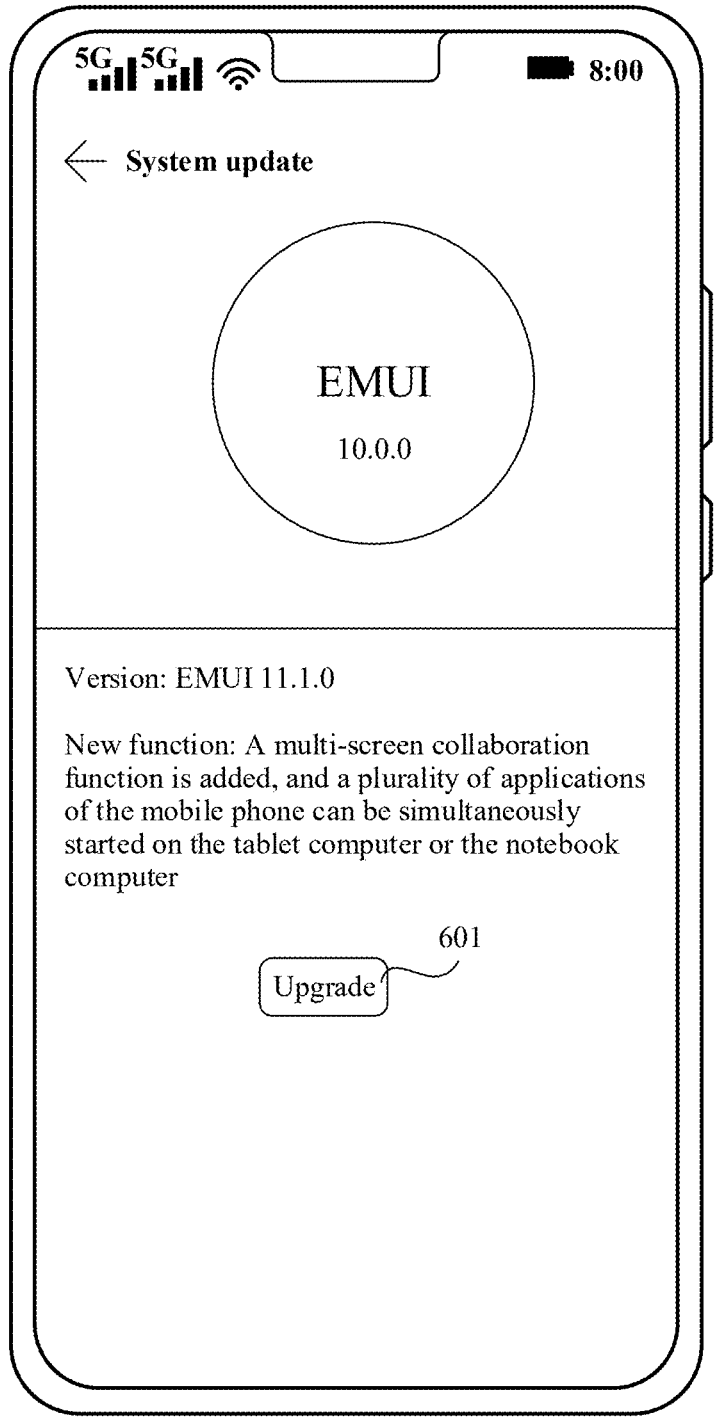
FIG. 6(a) to FIG. 6(d) are a schematic diagram of another application scenario of displaying upgrade prompt information according to an embodiment of this application.
Figure 6B:
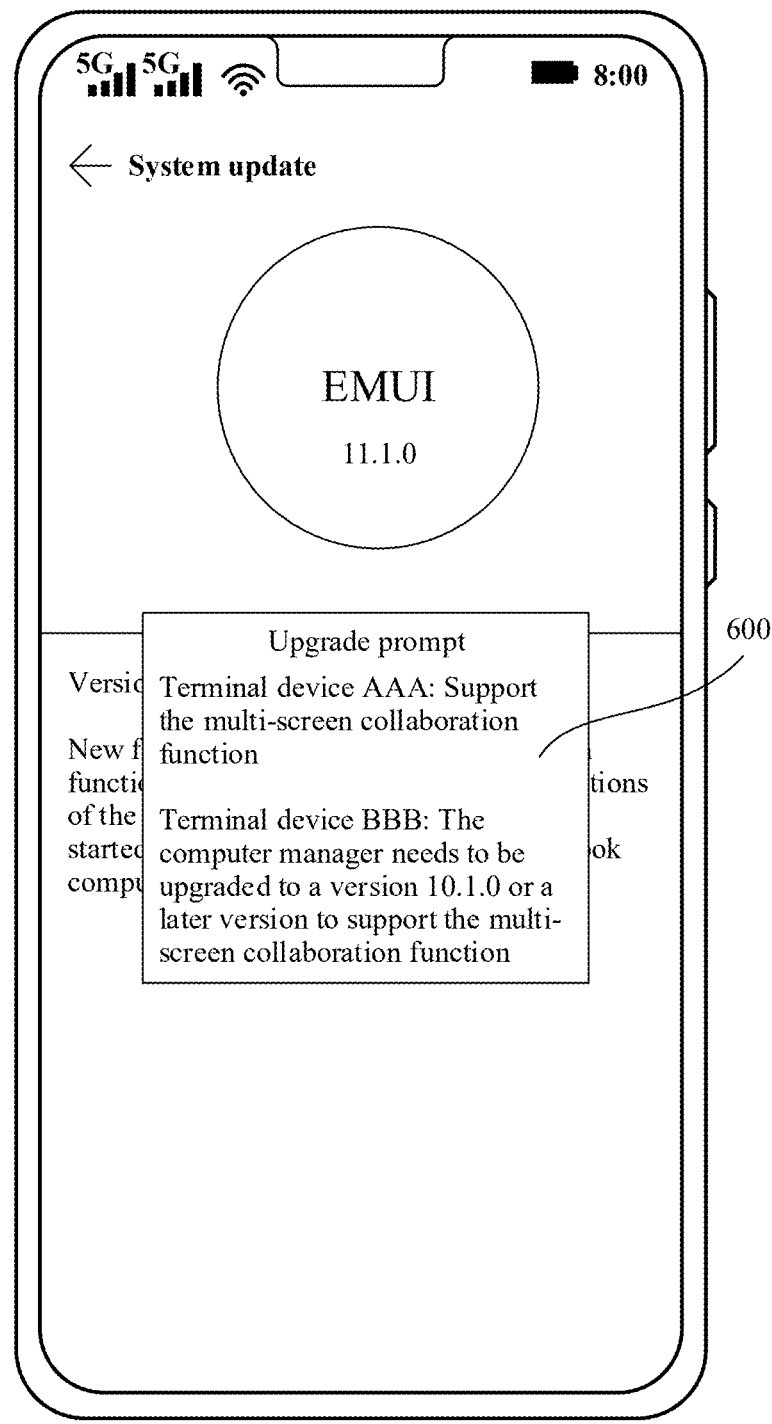

FIG. 6(a) to FIG. 6(d) are a schematic diagram of another application scenario in which a first terminal device displays upgrade prompt information. As shown in FIG. 6(a), when the upgrade version corresponding to the first terminal device is an upgrade version (for example, EMUI 11.1.0) of a system, the first terminal device may first display (1) in the upgrade prompt information and a first upgrade button 601 in a system update interface of the first terminal device. Then, after detecting that the system of the first terminal device is upgraded to EMUI 11.1.0, as shown in FIG. 6(b), the first terminal device may pop up an upgrade prompt window 600, and the upgrade prompt window 600 may display (2) in the upgrade prompt information.

Figure 6C:
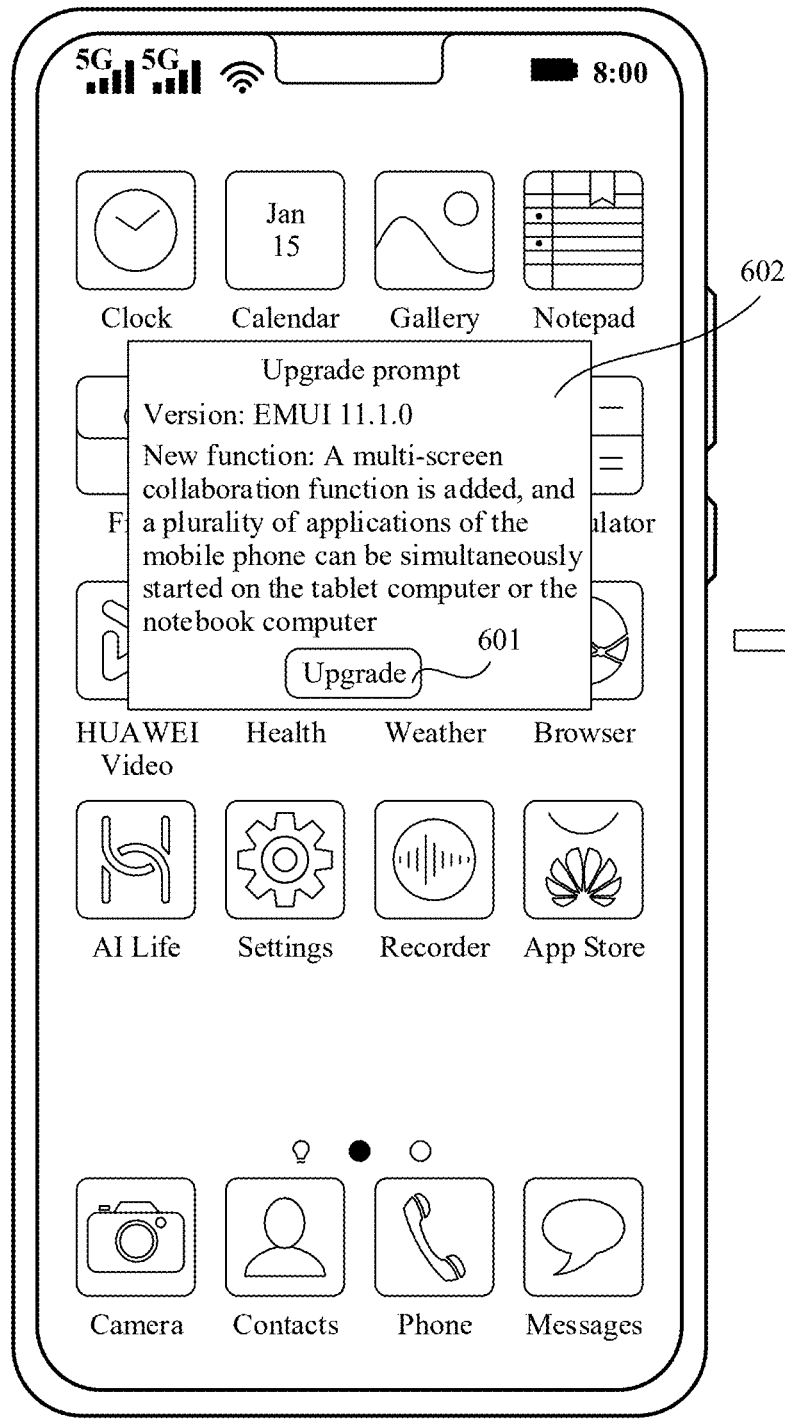
Figure 6D:
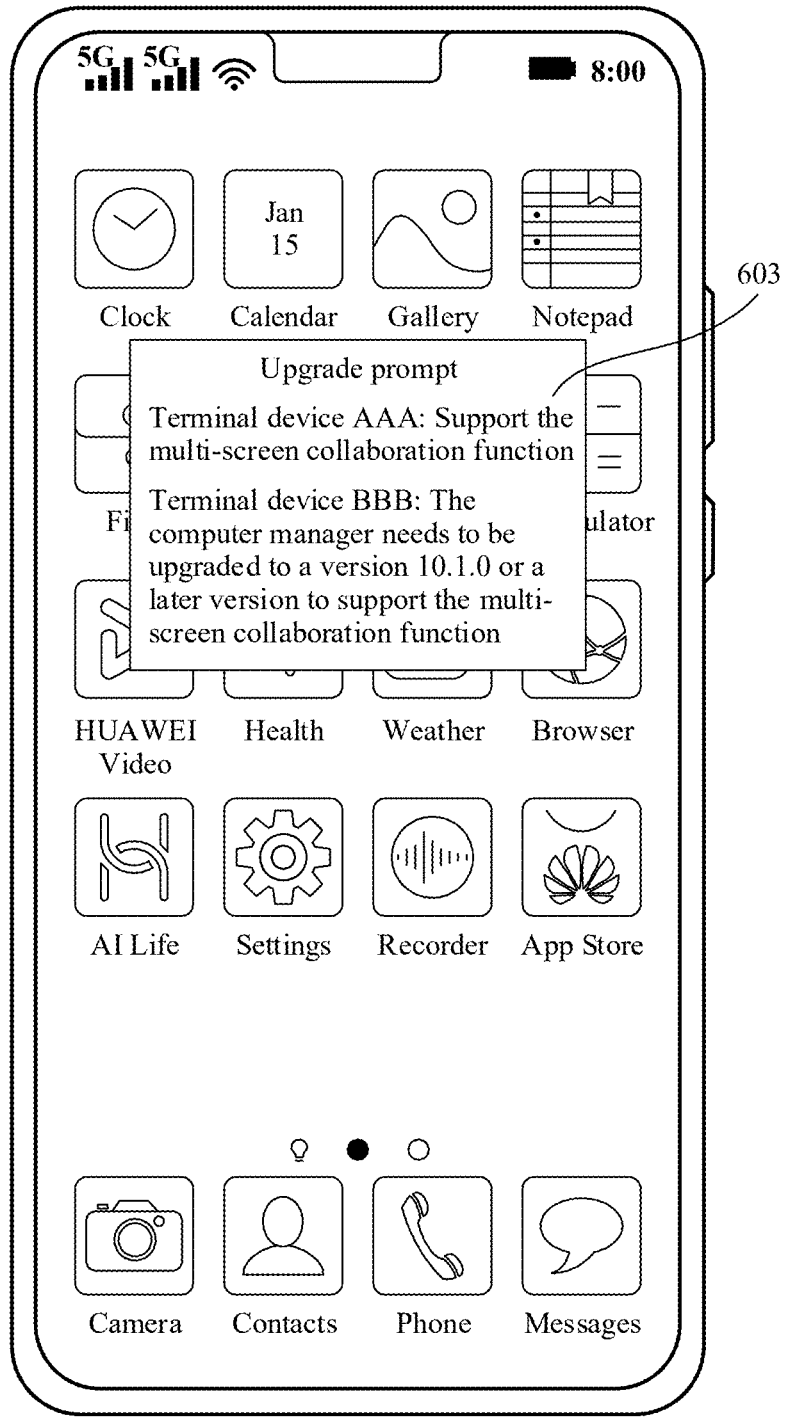

Alternatively, as shown in FIG. 6(c), the first terminal device may first pop up a first upgrade prompt window 602, and the first upgrade prompt window 602 may display (1) in the upgrade prompt information and the first upgrade button 601. The first terminal device may pop up the first upgrade prompt window 602 on a home screen of the first terminal device, or may pop up the first upgrade prompt window 602 in any application interface of the first terminal device, or may pop up the first upgrade prompt window 602 on a lock screen when the first terminal device is in a screen-locked state. In FIG. 6(c), an example in which the first upgrade prompt window 602 pops up on the home screen of the first terminal device is used for description. Herein, the home screen of the first terminal device may display application icons such as Clock, Calendar, Gallery, Notepad, Browser, Contacts, Phone, Settings, Computer, and Messages. Then, after detecting that the system of the first terminal device is upgraded to EMUI 11.1.0, as shown in FIG. 6(d), the first terminal device may pop up a second upgrade prompt window 603 to display (2) in the upgrade prompt information.

Similarly, when the upgrade version corresponding to the first terminal device is an upgrade version of an application, and the application is downloaded and installed from an application store of the first terminal device, the first terminal device may first display (1) in the upgrade prompt information in an application update interface that corresponds to the application and that is in the application store. Then, after detecting that the application is upgraded to the upgrade version, the first terminal device may pop up an upgrade prompt window to display (2) in the upgrade prompt information. Alternatively, the first terminal device may first pop up a first upgrade prompt window to display (1) in the upgrade prompt information. Then, after detecting that the application is upgraded to the upgrade version, the first terminal device may pop up a second upgrade prompt window to display (2) in the upgrade prompt information.

When the application is not downloaded and installed from the application store of the first terminal device, the first terminal device may first pop up a first upgrade prompt window to display (1) in the upgrade prompt information. Then, after detecting that the application is upgraded to the upgrade version, the first terminal device may pop up a second upgrade prompt window to display (2) in the upgrade prompt information.

Figure 7A:
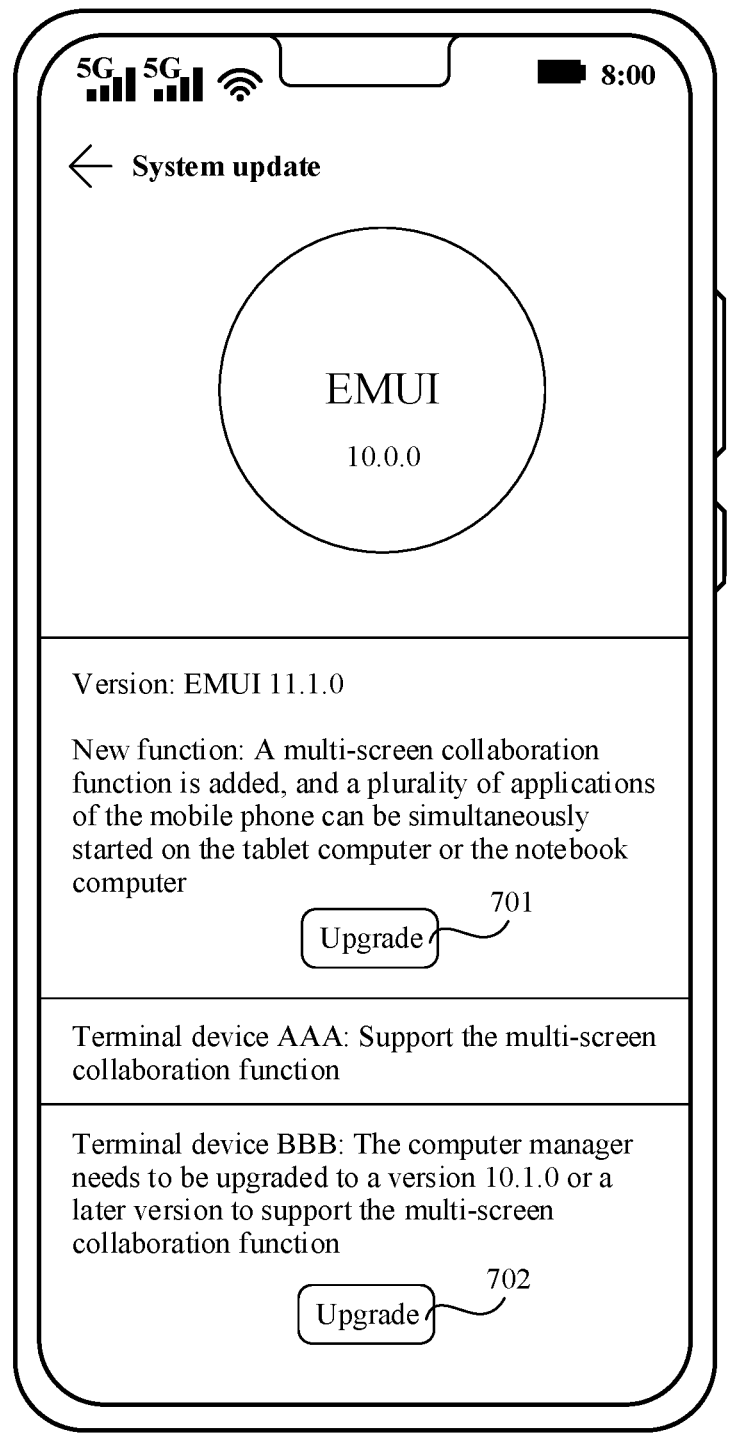
FIG. 7(a) to FIG. 7(c) are a schematic diagram of another application scenario of displaying upgrade prompt information according to an embodiment of this application.
Figure 7B:
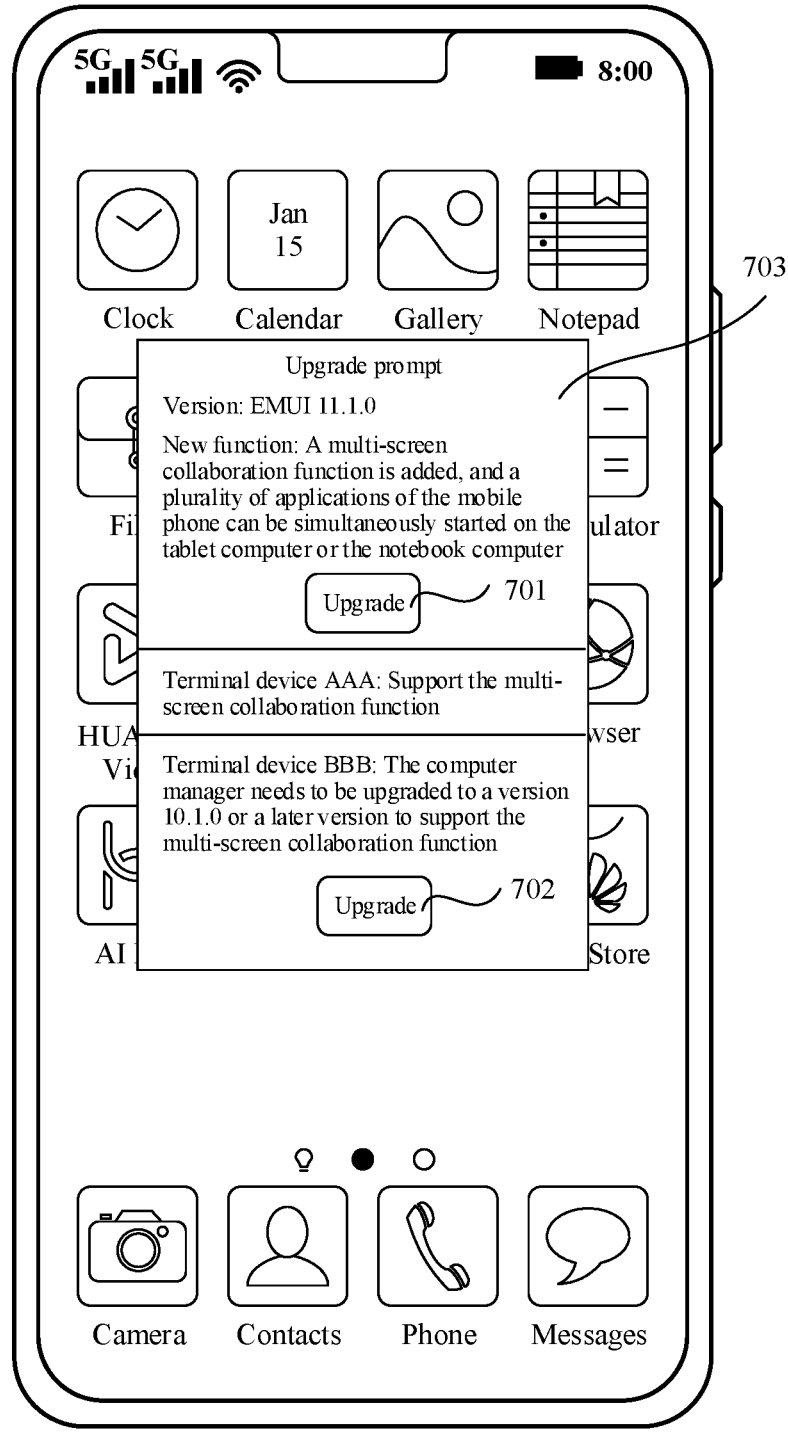
Figure 7C:
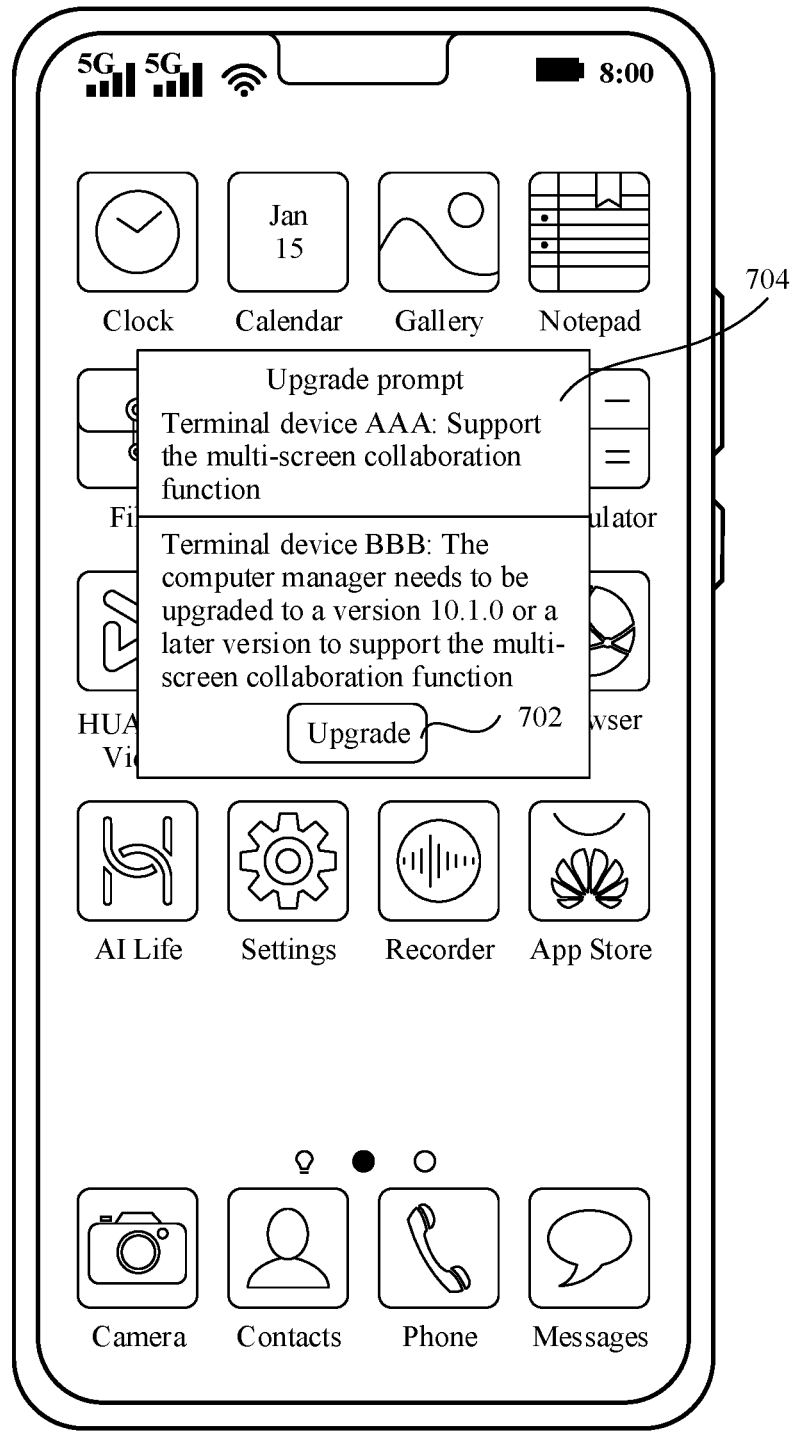

FIG. 7(a) to FIG. 7(c) are a schematic diagram of another application scenario in which a first terminal device displays upgrade prompt information. In this application scenario, when a second terminal device needs to be upgraded, and the first terminal device displays the upgrade prompt information, a second upgrade button corresponding to the second terminal device may be further displayed, so that the user can quickly upgrade a system or an application of the second terminal device by tapping or touching the second upgrade button, thereby improving upgrade efficiency, and improving user experience. The following is described by using an example in which the terminal device BBB shown in FIG. 5(a) needs to be upgraded.

As shown in FIG. 7(a), when a system of the first terminal device has an upgrade version EMUI 11.1.0, the first terminal device may display (1) and (2) in the upgrade prompt information, a first upgrade button 701, and a second upgrade button 702 in a system update interface of the first terminal device. Display locations of the first upgrade button 701 and the second upgrade button 702 are not specifically limited in this embodiment. For example, the first upgrade button 701 may be displayed immediately after (1) in the upgrade prompt information, and the second upgrade button 702 may be displayed immediately after remark information of a terminal device that needs to be upgraded.

Alternatively, as shown in FIG. 7(b), the first terminal device may display (1) and (2) in the upgrade prompt information, a first upgrade button 701, and a second upgrade button 702 in a pop-up upgrade prompt window 703. Alternatively, as shown in FIG. 6(c), the first terminal device may display (1) in the upgrade prompt information and a first upgrade button in a pop-up first upgrade prompt window. Then, after the system of the first terminal device is upgraded to EMUI 11.1.0, as shown in FIG. 7(c), the first terminal device may display (2) in the upgrade prompt information and a second upgrade button 702 in a pop-up second upgrade prompt window 704.

The first upgrade button 701 is used to trigger the first terminal device to perform system upgrade. The second upgrade button 702 is used to trigger upgrade of a system or an application of the second terminal device. The following is described by using an example in which a computer manager of the terminal device BBB needs to be upgraded to a version 10.0.1 or a later version.

When the user taps or touches the second upgrade button 702, the first terminal device may send an upgrade instruction to the terminal device BBB. After receiving the upgrade instruction, the terminal device BBB may upgrade the computer manager of the terminal device BBB to upgrade the computer manager to a version 10.0.1 or a later version.

Alternatively, after receiving the upgrade instruction, the terminal device BBB may pop up an upgrade confirmation window, and the upgrade confirmation window may display "Upgrade the computer manager?". In addition, the upgrade confirmation window may further display a confirm button and an ignore button. When the user taps or touches the confirm button on the terminal device BBB, the terminal device BBB may upgrade the computer manager of the terminal device BBB to upgrade the computer manager to a version 10.0.1 or a later version.

Similarly, when the upgrade version corresponding to the first terminal device is an upgrade version of an application, the first terminal device may display (1) and (2) in the upgrade prompt information, a first upgrade button, and a second upgrade button in an application update interface that corresponds to the application and that is in an application store. Alternatively, the first terminal device may display (1) and (2) in the upgrade prompt information, a first upgrade button, and a second upgrade button in a pop-up upgrade prompt window. Alternatively, the first terminal device may display (1) in the upgrade prompt information and a first upgrade button in a pop-up first upgrade prompt window, and display (2) in the upgrade prompt information and a second upgrade button in a pop-up second upgrade prompt window.

It may be understood that the upgrade prompt method provided in this embodiment may also be applied to a scenario in which an application is installed on the first terminal device. Specifically, when the user installs an application on the first terminal device, the first terminal device may send program information of the application to the cloud server 301. After obtaining the program information of the application, the cloud server 301 may determine, based on the program information, whether the application supports an interactive operation between a plurality of terminal devices. When the application supports an interactive operation between a plurality of terminal devices, the cloud server 301 may also generate the upgrade prompt information of the first terminal device based on the foregoing upgrade prompt method, and send the upgrade prompt information to the first terminal device for display. In this case, the upgrade prompt information generated by the cloud server 301 may include the remark information corresponding to the second terminal device. The second terminal device is a terminal device that can perform an interactive operation with the first terminal device for the application. That is, in a scenario of installing an application, the generated upgrade prompt information may include the following information: Among terminal devices of the user, which terminal device can directly perform an interactive operation, for the application, with the first terminal device on which the application is installed, and which terminal device needs to be upgraded to perform an interactive operation, for the application, with the first terminal device on which the application is installed.

In this embodiment, the program information may include a type of the application. A preset type of a preset application that supports an interactive operation between a plurality of terminal devices may be preset on the cloud server 301. Therefore, when the cloud server 301 obtains the type of the application, the cloud server 301 may determine, based on the type of the application and the preset preset type, whether the application supports an interactive operation between a plurality of terminal devices.

Alternatively, the program information may include attribute information of the application. When developing an application, a developer may configure attribute information indicating whether the application supports an interactive operation between a plurality of terminal devices. Therefore, when the cloud server 301 obtains the attribute information of the application, the cloud server 301 may also determine, based on the attribute information of the application, whether the application supports an interactive operation between a plurality of terminal devices.

Alternatively, the program information may include a name of the application. When developing an application, a developer can set an interface for externally reading code of the application. Therefore, after the cloud server 301 obtains the name of the application, the cloud server 301 may obtain an interface of the application by using the name of the application, to read code of the application by using the interface, and determine, by analyzing the code of the application, whether the application supports an interactive operation between a plurality of terminal devices.

For example, when the application is downloaded and installed from an application store corresponding to the first terminal device, the first terminal device may display the upgrade prompt information of the first terminal device in an application interface that corresponds to the application and that is in the application store of the first terminal device. When the application is not downloaded and installed from an application store corresponding to the first terminal device, the first terminal device may directly display the upgrade prompt information of the first terminal device by using a pop-up window. For example, after the first terminal device completes installation of the application, the first terminal device may display, by using a pop-up window, the remark information corresponding to the second terminal device, so that the user can upgrade the second terminal device in a timely manner, and the first terminal device on which the application is installed can perform an interactive operation with the second terminal device for the application.

The application store corresponding to the first terminal device is an application store that can be managed and controlled by the first terminal device. For example, when the first terminal device is a type-A mobile phone, the application store corresponding to the first terminal device may be an application store provided or specified by a developer of the type-A mobile phone.

It should be noted that, after the application is installed on the first terminal device, when the application subsequently has an upgrade version, the cloud server 301 may generate the upgrade prompt information of the first terminal device based on the foregoing upgrade prompt method. In this case, the upgrade prompt information may include description information of a new function or an optimized function of the application and the remark information corresponding to the second terminal device.

Embodiment 2

Figure 8:
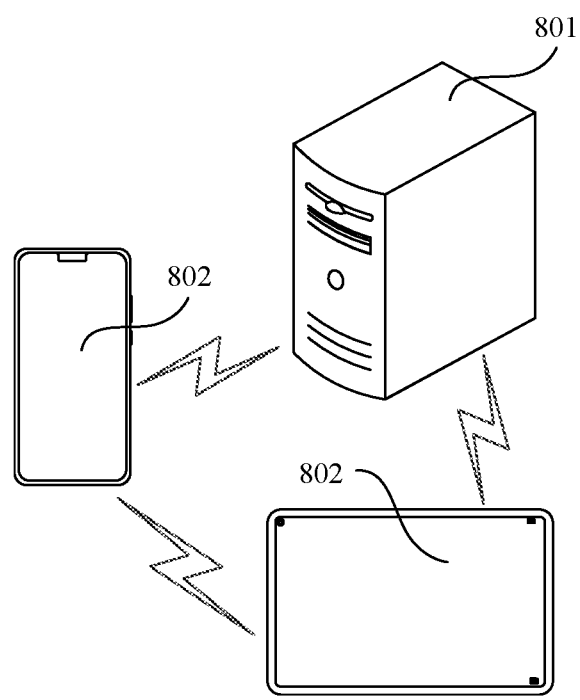
FIG. 8 is a schematic diagram of an application scenario of an upgrade prompt method according to another embodiment of this application.

FIG. 8 is a schematic diagram of an application scenario of an upgrade prompt method according to an embodiment. As shown in FIG. 8, the application scenario may include a cloud server 801 and a plurality of terminal devices 802 (only two terminal devices are shown in FIG. 8). The cloud server 801 may be communicatively connected to the plurality of terminal devices 802 by using a communication network, and the plurality of terminal devices 802 may be connected to each other by using the communication network. The plurality of terminal devices 802 may be associated devices of each other. The associated devices may be terminal devices managed by using a same account of a user, or may be terminal devices in a same network, for example, may be terminal devices in a same Internet of things.

When determining that a first terminal device (namely, any terminal device in FIG. 8) has an upgrade version, the cloud server 801 may obtain attribute information of the upgrade version, and send the attribute information of the upgrade version to the first terminal device. After receiving the attribute information of the upgrade version, the first terminal device may determine, based on the attribute information of the upgrade version and an associated device of the first terminal device, a second terminal device and a target version corresponding to the second terminal device. Next, the first terminal device may obtain a current version corresponding to the second terminal device, and generate, based on the target version and the current version that correspond to the second terminal device, remark information corresponding to the second terminal device. Then, the first terminal device may generate upgrade prompt information of the first terminal device based on the attribute information of the upgrade version and the remark information corresponding to the second terminal device, and display the upgrade prompt information, or send the upgrade prompt information to the second terminal device for display, to prompt the user to upgrade the first terminal device, and display whether the second terminal device that can perform an interactive operation with the first terminal device can currently perform an interactive operation with the upgraded first terminal device. Therefore, the user can upgrade the second terminal device in a timely manner, thereby facilitating the interactive operation between the first terminal device and the second terminal device, that is, facilitating the interactive operation between the first terminal device and the second terminal device for a new function or an optimized function in the upgrade version, and improving user experience.

Figure 9:
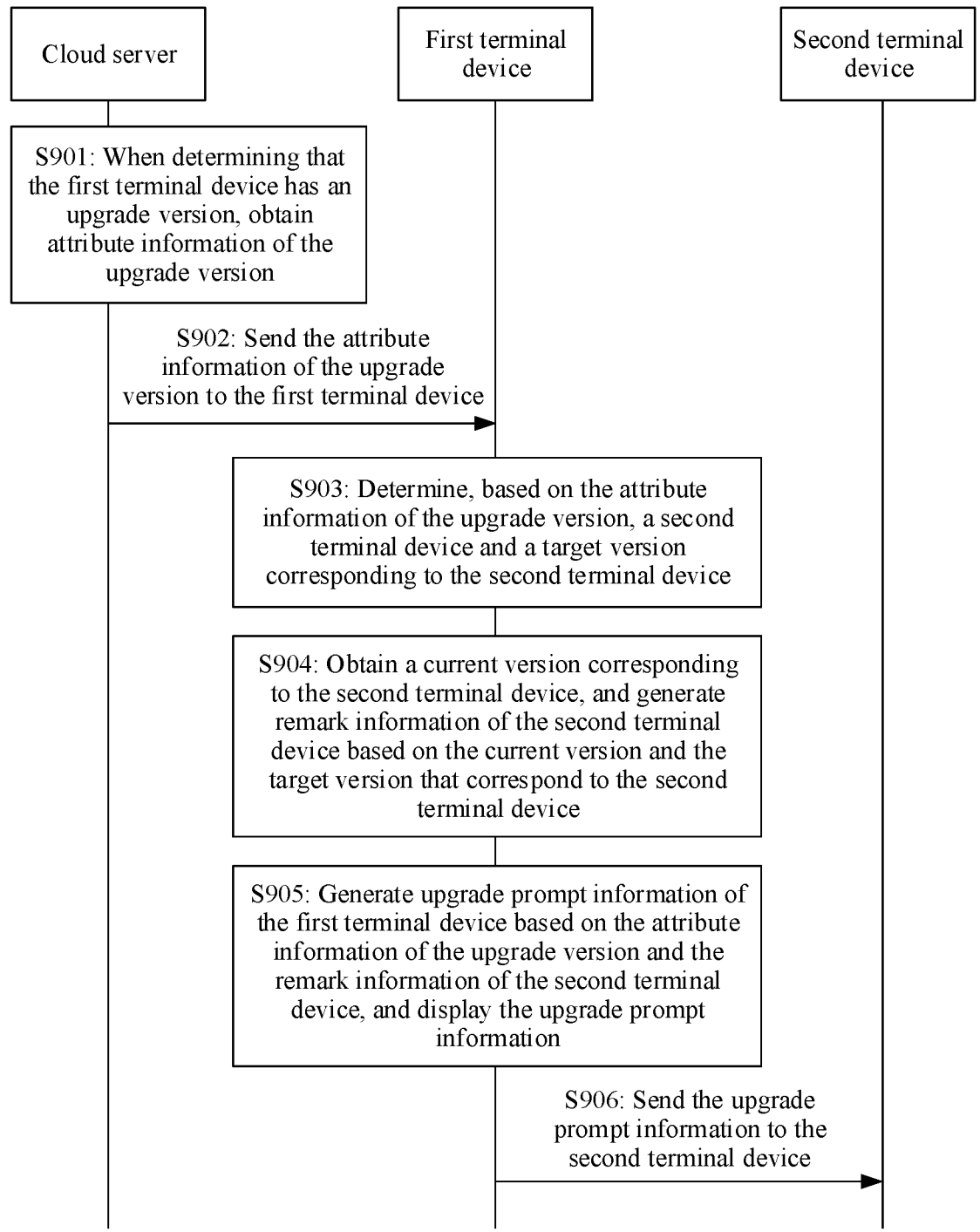
FIG. 9 is a schematic flowchart of an upgrade prompt method according to another embodiment of this application.

FIG. 9 is a schematic flowchart of an upgrade prompt method according to an embodiment. The method may be applied to the application scenario shown in FIG. 8, and the method may be performed by the first terminal device. As shown in FIG. 9, the method may include the following steps.

S901: When determining that the first terminal device has an upgrade version, the cloud server obtains attribute information of the upgrade version.

S902: The cloud server sends the attribute information of the upgrade version to the first terminal device.

In this embodiment, after establishing a communication connection to the first terminal device, the cloud server 801 may obtain device information such as a device identifier (for example, a device name or a device model) and a current version of the first terminal device in real time, and may determine, based on the obtained device identifier, a latest version that is on the cloud server 801 and that corresponds to the first terminal device. Then, the cloud server 801 may compare the current version of the first terminal device with the latest version. When the latest version is later than the current version of the first terminal device, the cloud server 801 may determine that the first terminal device has an upgrade version. In this case, the cloud server 301 may obtain the attribute information of the upgrade version, and may send the attribute information of the upgrade version to the first terminal device.

Same as Embodiment 1, the attribute information of the upgrade version may include description information of a new function or an optimized function in the upgrade version and device information of a target terminal device that can perform an interactive operation with the first terminal device for the new function or the optimized function. The device information of the target terminal device may include a device identifier (for example, a device name or a device model), a target version, and the like that correspond to the target terminal device.

S903: The first terminal device determines, based on the attribute information of the upgrade version, a second terminal device and a target version corresponding to the second terminal device.

After establishing a communication connection to an associated device of the first terminal device, the first terminal device may obtain device information of the associated device in real time, and may determine, based on the device information of the target terminal device in the attribute information and the device information of the associated device, the second terminal device and the target version corresponding to the second terminal device. Herein, for specific content that the first terminal device determines, based on the device information of the target terminal device and the device information of the associated device, the second terminal device and the target version corresponding to the second terminal device, refer to content in S402 in Embodiment 1. For brevity, details are not described herein again.

S904: The first terminal device obtains a current version corresponding to the second terminal device, and generates remark information of the second terminal device based on the current version and the target version that correspond to the second terminal device.

Herein, after the first terminal device is communicatively connected to the second terminal device, the first terminal device may obtain the current version corresponding to the second terminal device in real time. For specific content that the first terminal device generates, based on the current version and the target version that correspond to the second terminal device, the remark information corresponding to the second terminal device, refer to content, in S403 in Embodiment 1, that the cloud server generates, based on the current version and the target version that correspond to the second terminal device, the remark information corresponding to the second terminal device. For brevity, details are not described herein again.

S905: The first terminal device generates upgrade prompt information of the first terminal device based on the attribute information of the upgrade version and the remark information of the second terminal device, and displays the upgrade prompt information, or S906: The first terminal device sends the upgrade prompt information to the second terminal device for display.

In this embodiment, when the first terminal device is a terminal device with a display screen, for example, when the first terminal device is a terminal device with a display screen, such as a mobile phone, a tablet computer, or a notebook computer, the first terminal device may directly display the upgrade prompt information after generating the upgrade prompt information. For example, the upgrade prompt information is displayed by using a pop-up window, or the upgrade prompt information is displayed in a system update interface of the first terminal device or an application update interface of an application thereof. When the first terminal device is a terminal device without a display screen, for example, when the first terminal device is a smart home device without a display screen, such as a smart speaker or a smart bulb, the upgrade version corresponding to the first terminal device is generally an upgrade version of firmware on the smart speaker or the smart bulb. In this case, the first terminal device may send the upgrade prompt information to the second terminal device to display the upgrade prompt information of the first terminal device by using the second terminal device, so as to prompt the user to upgrade the first terminal device or prompt the user to upgrade the first terminal device and the second terminal device. An application that manages and controls the first terminal device is installed on the second terminal device, and the second terminal device may perform firmware upgrade on the first terminal device by using the application.

In a possible implementation, after the first terminal device is communicatively connected to the cloud server 801, the first terminal device may also obtain, in real time, a latest version that is on the cloud server 801 and that corresponds to the first terminal device, and compare the latest version with the current version corresponding to the first terminal device. When the latest version is later than the current version corresponding to the first terminal device, the first terminal device may determine that the first terminal device has an upgrade version. In this case, the first terminal device may obtain attribute information of the upgrade version (namely, the latest version) from the cloud server 801. Next, the first terminal device may determine, based on the attribute information of the upgrade version and the associated device of the first terminal device, the second terminal device and the target version corresponding to the second terminal device, and obtain the current version corresponding to the second terminal device. Then, the first terminal device may generate, based on the target version and the current version that correspond to the second terminal device, the remark information corresponding to the second terminal device, generate the upgrade prompt information of the first terminal device based on the attribute information of the upgrade version and the remark information corresponding to the second terminal device, and display the upgrade prompt information, or send the upgrade prompt information to the second terminal device for display, to prompt the user to upgrade the first terminal device or upgrade the first terminal device and the second terminal device, thereby facilitating the interactive operation between the first terminal device and the second terminal device for the new function, and improving user experience.

It should be understood that sequence numbers of the steps do not mean an execution sequence in the foregoing embodiments. The execution sequence of the processes should be determined based on functions and internal logic of the processes, and should not constitute any limitation on the implementation processes of the embodiments of this application.

An embodiment of this application further provides a terminal device. The terminal device includes at least one memory, at least one processor, and a computer program that is stored in the at least one memory and that can be run on the at least one processor. When the processor executes the computer program, the terminal device is enabled to implement the steps in any one of the foregoing method embodiments. For example, a structure of the terminal device may be shown in FIG. 1.

An embodiment of this application further provides a computer-readable storage medium. The computer-readable storage medium stores a computer program. When the computer program is executed by a computer, the computer is enabled to implement the steps in any one of the foregoing method embodiments.

An embodiment of this application provides a computer program product. When the computer program product is run on a terminal device, the terminal device is enabled to implement the steps in any one of the foregoing method embodiments.

When the integrated unit is implemented in the form of a software functional unit and sold or used as an independent product, the integrated unit may be stored in a computer-readable storage medium. Based on such an understanding, all or some procedures of the methods in the foregoing embodiments of this application may be implemented by a computer program instructing related hardware. The computer program may be stored in a computer-readable storage medium. When the computer program is executed by the processor, the steps in the foregoing method embodiments may be implemented. The computer program includes computer program code. The computer program code may be in a source code form, an object code form, an executable file form, some intermediate forms, or the like. The computer-readable storage medium may include at least any entity or apparatus that can carry computer program code to an apparatus/terminal device, a recording medium, a computer memory, a read-only memory (read-only memory, ROM), a random access memory (random access memory, RAM), an electrical carrier signal, a telecommunication signal, and a software distribution medium, for example, a USB flash drive, a removable hard disk, a magnetic disk, or an optical disk. In some jurisdictions, the computer-readable storage medium cannot be the electrical carrier signal or the telecommunication signal according to legislation and patent practices.

In the foregoing embodiments, the description of each embodiment has respective focuses. For a part that is not described in detail or recorded in an embodiment, refer to related descriptions in other embodiments.

A person of ordinary skill in the art may be aware that, in combination with examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In embodiments provided in this application, it should be understood that the disclosed apparatus/terminal device and method may be implemented in other manners. For example, the described apparatus/terminal device embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of embodiments.

The foregoing embodiments are merely intended to describe the technical solutions of this application, but are not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application, and these modifications and replacements shall fall within the protection scope of this application.

What is claimed is:

1. An upgrade prompt method, comprising:
in response to a determination that a first terminal device has an upgrade version, obtaining attribute information of the upgrade version, wherein the attribute information comprises device information identifying types of terminal devices capable of performing an interactive operation with the first terminal device for a new function or an optimized function added or optimized in the upgrade version;

determining, based on the attribute information of the upgrade version, a second terminal device and a target version corresponding to the second terminal device, wherein the second terminal device is a terminal device configured to perform the interactive operation with the first terminal device for the new function or the optimized function, and the new function or the optimized function is a function added or optimized in the upgrade version;

obtaining a current version corresponding to the second terminal device;

generating remark information of the second terminal device based on the current version and the target version corresponding to the second terminal device; and performing an upgrade prompt operation on the first terminal device based on the attribute information of the upgrade version and the remark information of the second terminal device.

2. The method according to claim 1, wherein performing the upgrade prompt operation on the first terminal device based on the attribute information of the upgrade version and the remark information of the second terminal device comprises:

generating upgrade prompt information of the first terminal device based on the attribute information of the upgrade version and the remark information of the second terminal device; and performing the upgrade prompt operation on the first terminal device based on the upgrade prompt information.

3. The method according to claim 2, wherein:

the method is applied to the first terminal device, the upgrade prompt information comprises first prompt information and second prompt information, the first prompt information comprises attribute information of the upgrade version, and the second prompt information comprises the remark information of the second terminal device; and performing the upgrade prompt operation on the first terminal device based on the upgrade prompt information comprises:

displaying, by the first terminal device, the first prompt information and the second prompt information, or sending the first prompt information and the second prompt information to the second terminal device to indicate to the second terminal device to display the first prompt information and the second prompt information.

4. The method according to claim 3, wherein displaying, by the first terminal device, the first prompt information and the second prompt information comprises:

displaying, by the first terminal device, the first prompt information and the second prompt information using a window.

5. The method according to claim 3, wherein displaying, by the first terminal device, the first prompt information and the second prompt information comprises:

displaying, by the first terminal device, the first prompt information and the second prompt information in an update interface corresponding to the upgrade version.

6. The method according to claim 3, wherein, in response to the remark information of the second terminal device comprising an indication that the second terminal device needs to be upgraded, the second prompt information further includes an upgrade button corresponding to the second terminal device, and the upgrade button is used to upgrade the second terminal device.

7. The method according to claim 2, wherein:

the method is applied to the first terminal device, the upgrade prompt information comprises first prompt information and second prompt information, the first prompt information comprises attribute information of the upgrade version, and the second prompt information comprises the remark information of the second terminal device; and performing the upgrade prompt operation on the first terminal device based on the upgrade prompt information comprises:

displaying, by the first terminal device, the first prompt information, or sending the first prompt information to the second terminal device, to indicate to the second terminal device to display the first prompt information.

8. The method according to claim 7, wherein:

performing the upgrade prompt operation on the first terminal device based on the upgrade prompt information further comprises:

in response to detecting that the first terminal device is upgraded to the upgrade version, displaying, by the first terminal device, the second prompt information, or sending the second prompt information to the second terminal device, to indicate to the second terminal device to display the second prompt information.

9. The method according to claim 2, wherein:

the method is applied to a cloud server, the upgrade prompt information comprises first prompt information and second prompt information, the first prompt information comprises attribute information of the upgrade version, and the second prompt information comprises the remark information of the second terminal device; and performing the upgrade prompt operation on the first terminal device based on the upgrade prompt information comprises:

sending, by the cloud server, the first prompt information and the second prompt information to the first terminal device, or sending the first prompt information and the second prompt information to the second terminal device, to indicate to the first terminal device or the second terminal device to display the first prompt information and the second prompt information.

10. The method according to claim 2, wherein:

the method is applied to a cloud server, the upgrade prompt information comprises first prompt information and second prompt information, the first prompt information comprises attribute information of the upgrade version, and the second prompt information comprises the remark information of the second terminal device; and performing the upgrade prompt operation on the first terminal device based on the upgrade prompt information comprises:

sending, by the cloud server, the first prompt information to the first terminal device, or sending the first prompt information to the second terminal device, to indicate to the first terminal device or the second terminal device to display the first prompt information.

11. The method according to claim 10, wherein performing the upgrade prompt operation on the first terminal device based on the upgrade prompt information further comprises:
in response to a determination that the first terminal device is upgraded to the upgrade version, sending, by the cloud server, the second prompt information to the first terminal device; or
sending the second prompt information to the second terminal device, to indicate to the first terminal device or the second terminal device to display the second prompt information.

12. The method according to claim 1, wherein:
the attribute information of the upgrade version comprises a device identifier and a target version that correspond to a target terminal device; and
determining, based on the attribute information of the upgrade version, the second terminal device and a target version corresponding to the second terminal device comprises:
determining the second terminal device from an associated device of the first terminal device based on the device identifier corresponding to the target terminal device, and
determining, based on the target version corresponding to the target terminal device, the target version corresponding to the second terminal device.

13. A terminal device, comprising a memory, a processor, and a computer program stored in the memory and executed by the processor, wherein the computer program, when executed by the processor, enables the terminal device to implement the following steps:
in response to a determination that a first terminal device has an upgrade version, obtaining attribute information of the upgrade version, wherein the attribute information comprises device information identifying types of terminal devices capable of performing an interactive operation with the first terminal device for a new function or an optimized function added or optimized in the upgrade version;
determining, based on the attribute information of the upgrade version, a second terminal device and a target version corresponding to the second terminal device, wherein the second terminal device is a terminal device configured to perform the interactive operation with the first terminal device for the new function or the optimized function, and the new function or the optimized function is a function added or optimized in the upgrade version;
obtaining a current version corresponding to the second terminal device;
generating remark information of the second terminal device based on the current version and the target version corresponding to the second terminal device; and
performing an upgrade prompt operation on the first terminal device based on the attribute information of the upgrade version and the remark information of the second terminal device.

14. The terminal device according to claim 13, wherein performing the upgrade prompt operation on the first terminal device based on the attribute information of the upgrade version and the remark information of the second terminal device comprises:
generating upgrade prompt information of the first terminal device based on the attribute information of the upgrade version and the remark information of the second terminal device; and
performing the upgrade prompt operation on the first terminal device based on the upgrade prompt information.

15. The terminal device according to claim 14, wherein the upgrade prompt information comprises first prompt information and second prompt information, the first prompt information comprises attribute information of the upgrade version, and the second prompt information comprises the remark information of the second terminal device; and
performing the upgrade prompt operation on the first terminal device based on the upgrade prompt information comprises:
displaying the first prompt information and the second prompt information, or
sending the first prompt information and the second prompt information to the second terminal device, to indicate to the second terminal device to display the first prompt information and the second prompt information.

16. The terminal device according to claim 15, wherein displaying the first prompt information and the second prompt information comprises:
displaying the first prompt information and the second prompt information by using a window.

17. The terminal device according to claim 15, wherein displaying, by the first terminal device, the first prompt information and the second prompt information comprises:
displaying the first prompt information and the second prompt information in an update interface corresponding to the upgrade version.

18. The terminal device according to claim 14, wherein the upgrade prompt information comprises first prompt information and second prompt information, the first prompt information comprises attribute information of the upgrade version, and the second prompt information comprises the remark information of the second terminal device; and
performing the upgrade prompt operation on the first terminal device based on the upgrade prompt information comprises:
displaying the first prompt information, or
sending the first prompt information to the second terminal device, to indicate to the second terminal device to display the first prompt information.

19. The terminal device according to claim 13, wherein the attribute information of the upgrade version comprises a device identifier and a target version that correspond to a target terminal device; and
determining, based on the attribute information of the upgrade version, the second terminal device and the target version corresponding to the second terminal device comprises:
determining the second terminal device from an associated device of the first terminal device based on the device identifier corresponding to the target terminal device, and
determining, based on the target version corresponding to the target terminal device, the target version corresponding to the second terminal device.

20. A non-transitory computer-readable storage medium with a computer program stored thereon, wherein when the computer program is executed by a computer, the computer is enabled to perform the following steps:
in response to a determination that a first terminal device has an upgrade version, obtaining attribute information of the upgrade version, wherein the attribute information comprises device information identifying types of terminal devices capable of performing an interactive operation with the first terminal device for a new function or an optimized function added or optimized in the upgrade version;

determining, based on the attribute information of the upgrade version, a second terminal device and a target version corresponding to the second terminal device, wherein the second terminal device is a terminal device configured to perform the interactive operation with the first terminal device for the new function or the optimized function, and the new function or the optimized function is a function added or optimized in the upgrade version;

obtaining a current version corresponding to the second terminal device, and generating remark information of the second terminal device based on the current version and the target version corresponding to the second terminal device; and performing an upgrade prompt operation on the first terminal device based on the attribute information of the upgrade version and the remark information of the second terminal device.

* * * * *